US008547437B2

(12) United States Patent
Buehler et al.

(10) Patent No.: US 8,547,437 B2
(45) Date of Patent: Oct. 1, 2013

(54) METHOD AND SYSTEM FOR TRACKING AND BEHAVIORAL MONITORING OF MULTIPLE OBJECTS MOVING THROUGH MULTIPLE FIELDS-OF-VIEW

(75) Inventors: Christopher J. Buehler, Cambridge, MA (US); Neil Brock, Acton, MA (US); Jehanbux Edulbehram, Boston, MA (US); Patrick Sobalvarro, Woburn, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 1854 days.

(21) Appl. No.: 10/706,850

(22) Filed: Nov. 12, 2003

(65) Prior Publication Data

US 2004/0130620 A1   Jul. 8, 2004

Related U.S. Application Data

(60) Provisional application No. 60/425,267, filed on Nov. 12, 2002.

(51) Int. Cl.
*H04N 5/225* (2006.01)
*H04N 7/00* (2011.01)

(52) U.S. Cl.
USPC ........... 348/169; 348/143; 348/152; 348/156; 348/168; 348/170; 348/171; 348/172

(58) Field of Classification Search
USPC .......................... 348/143, 150–156, 169–172
See application file for complete search history.

(56) References Cited

U.S. PATENT DOCUMENTS

| | | | |
|---|---|---|---|
| 3,740,466 A | 6/1973 | Marshall et al. | 178/6.8 |
| 4,511,886 A | 4/1985 | Rodriguez | 340/534 |
| 4,737,847 A | 4/1988 | Araki et al. | 358/108 |
| 5,005,083 A * | 4/1991 | Grage et al. | 348/588 |
| 5,097,328 A | 3/1992 | Boyette | 358/108 |
| 5,164,827 A | 11/1992 | Paff | 358/108 |
| 5,179,441 A | 1/1993 | Anderson et al. | 358/88 |
| 5,216,502 A | 6/1993 | Katz | 358/108 |
| 5,237,408 A | 8/1993 | Blum et al. | 358/108 |

(Continued)

FOREIGN PATENT DOCUMENTS

| | | |
|---|---|---|
| EP | 0 529 317 A1 | 3/1993 |
| EP | 0 714 081 A1 | 5/1996 |

(Continued)

OTHER PUBLICATIONS

Vera Kettnaker, Bayesian Multi-camera Surveillance, 1999 IEEE.*

(Continued)

*Primary Examiner* — Sath V Perungavoor
*Assistant Examiner* — Geepy Pe
(74) *Attorney, Agent, or Firm* — Goodwin Procter LLP

(57) ABSTRACT

A computerized method of video analysis that includes receiving several series of video frames generated by a number of image sensors. Each image sensor has its own field-of-view which can, but does not have to, overlap with another image sensor's field-of-view. The image sensors monitor a portion of a monitored environment. The computerized method also includes concurrently tracking, independent of calibration, multiple objects within the monitored environment as the objects move between fields-of-view, and multiple objects within one field-of-view. The tracking is based on the plurality of received series of video frames.

29 Claims, 17 Drawing Sheets

(56) References Cited

U.S. PATENT DOCUMENTS

| | | | |
|---|---|---|---|
| 5,243,418 A | 9/1993 | Kuno et al. | 358/108 |
| 5,258,837 A | 11/1993 | Gormley | |
| 5,298,697 A | 3/1994 | Suzuki et al. | 187/131 |
| 5,305,390 A | 4/1994 | Frey et al. | 382/2 |
| 5,317,394 A | 5/1994 | Hale et al. | 348/208 |
| 5,581,625 A | 12/1996 | Connell | 382/1 |
| 5,666,157 A | 9/1997 | Aviv | 348/152 |
| 5,699,444 A | 12/1997 | Palm | 382/106 |
| 5,729,471 A | 3/1998 | Jain et al. | 364/514 |
| 5,734,737 A | 3/1998 | Chang et al. | 382/107 |
| 5,745,126 A | 4/1998 | Jain et al. | 345/952 |
| 5,845,009 A * | 12/1998 | Marks et al. | 382/228 |
| 5,920,338 A | 7/1999 | Katz | 348/150 |
| 5,956,081 A | 9/1999 | Katz et al. | 348/163 |
| 5,969,755 A | 10/1999 | Courtney | 348/143 |
| 5,973,732 A | 10/1999 | Guthrie | 348/169 |
| 6,002,995 A | 12/1999 | Suzuki et al. | 702/188 |
| 6,028,626 A | 2/2000 | Aviv | 348/152 |
| 6,049,363 A | 4/2000 | Courtney et al. | 348/700 |
| 6,061,088 A | 5/2000 | Khosravi et al. | 348/169 |
| 6,069,655 A | 5/2000 | Seeley et al. | 348/154 |
| 6,075,560 A | 6/2000 | Katz | 348/150 |
| 6,091,771 A | 7/2000 | Seeley et al. | |
| 6,097,429 A | 8/2000 | Seeley et al. | 348/154 |
| 6,185,314 B1 | 2/2001 | Crabtree et al. | 382/103 |
| 6,188,777 B1 | 2/2001 | Darrell et al. | 382/103 |
| 6,237,647 B1 | 5/2001 | Pong et al. | 141/94 |
| 6,285,746 B1 | 9/2001 | Duran et al. | 379/93.21 |
| 6,295,367 B1 | 9/2001 | Crabtree et al. | 382/103 |
| 6,359,647 B1 * | 3/2002 | Sengupta et al. | 348/154 |
| 6,377,296 B1 * | 4/2002 | Zlatsin et al. | 348/143 |
| 6,396,535 B1 | 5/2002 | Waters | 348/159 |
| 6,400,830 B1 | 6/2002 | Christian et al. | 382/103 |
| 6,400,831 B2 | 6/2002 | Lee et al. | 382/103 |
| 6,437,819 B1 | 8/2002 | Loveland | 348/143 |
| 6,441,846 B1 * | 8/2002 | Carlbom et al. | 348/169 |
| 6,442,476 B1 | 8/2002 | Poropat | 701/207 |
| 6,456,320 B2 | 9/2002 | Kuwano et al. | 348/143 |
| 6,456,730 B1 | 9/2002 | Taniguchi | 382/107 |
| 6,476,858 B1 | 11/2002 | Ramirez Diaz et al. | |
| 6,483,935 B1 | 11/2002 | Rostami et al. | 382/141 |
| 6,502,082 B1 | 12/2002 | Toyama et al. | 706/16 |
| 6,516,090 B1 | 2/2003 | Lennon et al. | 382/173 |
| 6,522,787 B1 | 2/2003 | Kumar et al. | 382/268 |
| 6,526,156 B1 | 2/2003 | Black et al. | 382/103 |
| 6,549,643 B1 | 4/2003 | Toklu et al. | 382/107 |
| 6,549,660 B1 | 4/2003 | Lipson et al. | 382/224 |
| 6,570,608 B1 * | 5/2003 | Tserng | 348/143 |
| 6,574,353 B1 | 6/2003 | Schoepflin et al. | 382/103 |
| 6,580,821 B1 | 6/2003 | Roy | 382/154 |
| 6,591,005 B1 | 7/2003 | Gallagher | 382/154 |
| 6,690,374 B2 | 2/2004 | Park et al. | |
| 6,698,021 B1 | 2/2004 | Amini et al. | 725/105 |
| 6,731,805 B2 * | 5/2004 | Brodsky et al. | 382/199 |
| 6,791,603 B2 | 9/2004 | Lazo et al. | 348/169 |
| 6,798,445 B1 | 9/2004 | Brummitt et al. | 348/207.11 |
| 6,798,897 B1 * | 9/2004 | Rosenberg | 382/107 |
| 6,813,372 B2 | 11/2004 | Standridge et al. | 382/107 |
| 6,972,787 B1 * | 12/2005 | Allen et al. | 348/162 |
| 7,023,913 B1 * | 4/2006 | Monroe | 375/240.01 |
| 7,698,450 B2 | 4/2010 | Monroe et al. | |
| 7,784,080 B2 | 8/2010 | Renkis | |
| 7,796,154 B2 | 9/2010 | Senior et al. | |
| 2001/0032118 A1 | 10/2001 | Carter | 705/11 |
| 2002/0140722 A1 | 10/2002 | Ayyar et al. | |
| 2002/0159635 A1 * | 10/2002 | Hill et al. | 382/173 |
| 2003/0025599 A1 | 2/2003 | Monroe | |
| 2003/0025800 A1 | 2/2003 | Hunter et al. | 348/208.13 |
| 2003/0040815 A1 | 2/2003 | Pavlidis | 700/48 |
| 2003/0053658 A1 | 3/2003 | Pavlidis | |
| 2003/0058111 A1 | 3/2003 | Lee et al. | 340/573.1 |
| 2003/0058237 A1 | 3/2003 | Lee | 345/418 |
| 2003/0058341 A1 | 3/2003 | Brodsky et al. | 348/169 |
| 2003/0058342 A1 | 3/2003 | Trajkovic | 348/207.1 |
| 2003/0071891 A1 | 4/2003 | Geng | 348/39 |
| 2003/0103139 A1 | 6/2003 | Pretzer et al. | 348/143 |
| 2003/0123703 A1 | 7/2003 | Pavlidis et al. | 382/103 |
| 2003/0174773 A1 | 9/2003 | Comaniciu et al. | |
| 2003/0197612 A1 | 10/2003 | Tanaka et al. | 340/572.1 |
| 2003/0197785 A1 | 10/2003 | White et al. | |
| 2004/0081895 A1 | 4/2004 | Adachi et al. | |
| 2004/0130620 A1 | 7/2004 | Buehler et al. | 348/143 |
| 2004/0155960 A1 | 8/2004 | Wren et al. | 348/150 |
| 2004/0160317 A1 | 8/2004 | McKeown et al. | 340/522 |
| 2004/0164858 A1 | 8/2004 | Lin | 340/522 |
| 2004/0252197 A1 | 12/2004 | Fraley et al. | 348/207.1 |
| 2005/0012817 A1 | 1/2005 | Hampapur et al. | |
| 2005/0017071 A1 | 1/2005 | Noonan | 235/385 |
| 2005/0073418 A1 | 4/2005 | Kelliher et al. | 340/572.1 |
| 2005/0073585 A1 | 4/2005 | Ettinger et al. | |
| 2005/0078006 A1 | 4/2005 | Hutchins et al. | 340/561 |
| 2005/0102183 A1 | 5/2005 | Kelliher et al. | 705/16 |
| 2005/0185823 A1 | 8/2005 | Brown et al. | |
| 2006/0004579 A1 | 1/2006 | Claudatos et al. | |
| 2010/0002082 A1 | 1/2010 | Buehler et al. | |

FOREIGN PATENT DOCUMENTS

| | | |
|---|---|---|
| EP | 0 967 584 A2 | 12/1999 |
| EP | 1 189 187 | 3/2002 |
| EP | 1189187 A2 | 3/2002 |
| EP | 2328131 | 6/2011 |
| JP | 8011071 | 1/1996 |
| WO | 97/04428 | 2/1997 |
| WO | WO-0146923 | 6/2001 |
| WO | 01/82626 A1 | 11/2001 |
| WO | WO-0182626 | 11/2001 |
| WO | WO-2004034347 | 4/2004 |
| WO | WO-2004081895 | 9/2004 |

OTHER PUBLICATIONS

Author unknown. "The Future of Security Systems" retreived from the internet on May 24, 2005, http://www.activeye.com/; http://www.activeye.com/act_alert.htm; http://www.activeye.com/tech.htm;http://www.activeye.com/ae_team.htm; 7 pgs.

International Preliminary Report on Patentability for PCT/US2004/029417 dated Mar. 13, 2006.

International Preliminary Report on Patentability for PCT/US2004/033177 dated Apr. 10, 2006.

International Preliminary Report on Patentability for PCT/US2004/033168 dated Apr. 10, 2006.

International Search Report for PCT/US2004/033177 dated Dec. 12, 2005.

Written Opinion for PCT/US2004/033177.

International Search Report for PCT/US04/29417 dated Mar. 18, 2005.

Written Opinion of the International Searching Authority for PCT/US04/29417.

International Search Report for PCT/US04/033168 dated Feb. 25, 2005.

Written Opinion of the Internation Searching Authority for PCT/US04/033168 dated Feb. 25, 2005.

International Search Report for PCT/US04/29418 dated Feb. 28, 2005.

Written Opinion of the Internation Searching Authority for PCT/US04/29418 dated Feb. 25, 2005.

Chang et al., "Tracking Multiple People with a Multi-Camera System," *IEEE*, 19-26 (2001).

International Search Report for International Application No. PCT/US03/35943 dated Apr. 13, 2004.

Khan et al., "Human Tracking in Multiple Cameras," *IEEE*, 331-336 (2001).

Fernyhough, Jonathan et al., Generation of Semantic Regions from Image Sequences, Division of Artificial Intelligence, School of Computer Studies, University of Leeds, Leeds, LS2 9JT (p. 475-484).

Bui H H et al, "A probalistic framework for tracking in wide-area environments" Pattern Recognition, 2000. Porceedings, 15th International Conference on Sep. 3-7, 2000; [Proceedings of the international conference on pattern recognition. (icpr)], Los Alamitos, CA , USA, IEEE Computer Soc., Us, vo. 4, Sep. 3, 2000 pp. 702-705 (4 pages).

Ting-Hsun Change et al., "Tracking mulitiple people with a multi-camera system" Multi-Object Tracking, 2001. Proceedings, 2001 IEEE Workshop on Jul. 8, 2001, Piscataway, NJ, USA, IEEE, Jan. 1, 2001, pp. 19-26 (8 pages).

Canadian Examiner's Report for Canadian Application No. 2,505,831 issued by the Canadian Intellectual Property Office on Feb. 29, 2012 (4 pages).

Fernyhough, Jonathan et al., Generation of Semantic Regions from Image Sequences, Division of Artificial Intelligence, School of Computer Studies, University of Leeds, Leeds, LS2 9JT (p. 475-484), 1996.

Gallagher, Andrew C., A ground truth based vanishing point detection algorithm, from The Journal of the Pattern Recognition Society, Electronic Imaging Products, Eastman Kodak Company, Jun. 18, 2001 (p. 1527-1543).

Makris, Dimitrios, et al., Automatic Learning of an Activity-Based Semantic Scene Model from the Information Engineering Centre, City University, London, UK, The Computer Society, 2003 (6 pages).

Olson, Thomas J., et al. Moving Object Detection and Event Recognition Algorithms for Smart Cameras, Texas Instruments Research and Development, 1997 (p. 159-175).

Hampapur et al., "Face Cataloger: Multi-Scale Imaging for Relating Identity to Location," Proceedings of the IEEE Conference on Advanced Video and Signal based Surveillance, 2003 IEEE (8 pages).

International Search Report for PCT/US2006/010570, dated Sep. 12, 2007 (5 pages).

International Search Report for PCT/US2006/021087 dated Oct. 19, 2006 (3 pages).

Written Opinion of the International Searching Authority for PCT/US2006/021087 dated Oct. 19, 2006 (5 pages).

Written Opinion of the International Searching Authority for PCT/US2006/010570, dated Sep. 12, 2007 (7 pages).

* cited by examiner

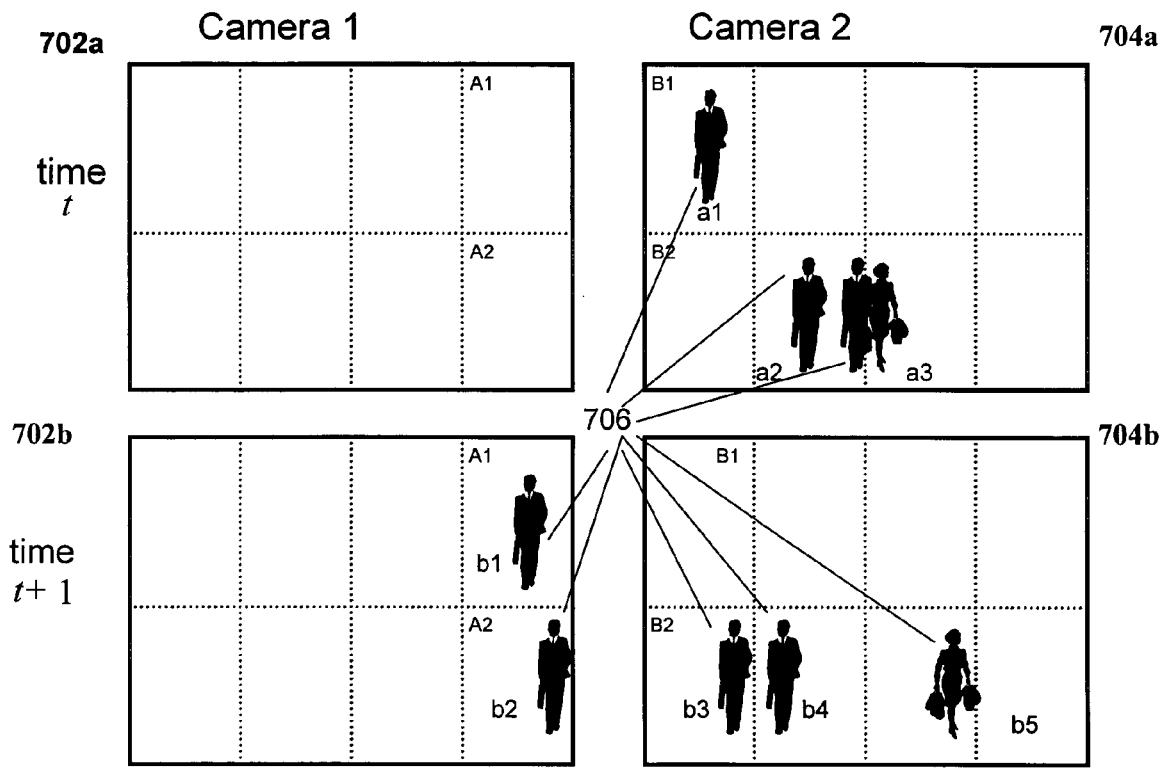

1000

|   | $b_1$ | $b_2$ | $b_3$ | $b_4$ | $b_5$ |
|---|---|---|---|---|---|
| $a_1$ | (0.8) | X | X | X | X |
| $a_2$ | X | X | (0.7) | 0.9 | X |
| $a_3$ | X | X | 0.1 | (0.6) | 0.3 |

|   | $b_5$ |
|---|---|
| $a_1$ | X |
| $a_2$ | X |
| $a_3$ | (0.3) |

Fig. 10B

METHOD AND SYSTEM FOR TRACKING AND BEHAVIORAL MONITORING OF MULTIPLE OBJECTS MOVING THROUGH MULTIPLE FIELDS-OF-VIEW

CROSS-REFERENCE TO RELATED APPLICATION

This application claims priority to and the benefit of, and incorporates herein by reference in its entirety, provisional U.S. patent application Ser. No. 60/425,267, filed Nov. 12, 2002.

TECHNICAL FIELD

The present invention generally relates to video surveillance, and more specifically to a computer aided surveillance system capable of tracking multiple objects.

BACKGROUND

The current heightened sense of security and declining cost of camera equipment have resulted in increased use of closed circuit television (CCTV) surveillance systems. Such systems have the potential to reduce crime, prevent accidents, and generally increase security in a wide variety of environments.

A simple closed-circuit television system uses a single camera connected to a display device. More complex systems can have multiple cameras and/or multiple displays. One known type of system is the security display in a retail store, which switches periodically between different cameras to provide different views of the store. Higher security installations, such as prisons and military installations, use a bank of video displays each displaying the output of an associated camera. A guard or human attendant watches the various screens looking for suspicious activity.

More recently, inexpensive digital cameras have become popular for security and other applications. "Web cams" may also be used to monitor remote locations. Web cams typically have relatively slow frame rates, but are sufficient for some security applications. Inexpensive cameras that transmit signals wirelessly to remotely located computers or other displays are also used to provide video surveillance.

As the number of cameras in a surveillance system increases, the amount of raw information that needs to be processed and analyzed also increases. Computer technology can be used to alleviate this raw data processing task, resulting in a new breed of information technology device—the computer-aided surveillance (CAS) system. Computer-aided surveillance technology has been developed for various applications. For example, the military has used computer-aided image processing to provide automated targeting and other assistance to fighter pilots and other personnel. In addition, computer-aided surveillance has been applied to monitor activity in other environments such as swimming pools, stores, and parking lots.

A CAS system automatically monitors objects (e.g., people, inventory, etc.) as they appear in series of surveillance video frames. One particularly useful monitoring task is tracking the movements of objects in a monitored area. Methods for tracking objects, such as people, moving through an image are known in the art. To achieve more accurate tracking information, the CAS system can utilize knowledge about the basic elements of the images depicted in the series of surveillance video frames.

Generally, a video surveillance frame depicts an image of a scene in which people and things move and interact. A video frame is composed of a plurality of pixels, often arranged in a grid-like fashion. The number of pixels in an image depends on several factors including the resolution of the camera generating the image, the display on which the image is presented, the capacity of the storage device on which the images are stored, etc. Analysis of a video frame can be conducted either at the pixel level or at the (pixel) group level depending on the processing capability and the desired level of precision. A pixel or group of pixels being analyzed is referred to herein as an "image region."

Image regions can be categorized as depicting part of the background of the frame or as depicting a foreground object. A set of contiguous pixels determined to depict one or more foreground objects is referred to as "blob." In general, the background remains relatively static in each frame. However, objects are depicted in different image regions in different frames. Several methods for separating objects in a video frame from the background of the frame, referred to as object or blob extraction, are known in the art. A common approach is to use a technique called "background subtraction." Of course, other techniques can be used.

A robust tracking system faces many difficulties. Changes in scene lighting can affect the quality of object extraction, causing foreground elements to be misshapen or omitted completely. Object occlusions can cause objects to disappear or merge together, leading to difficulties in correspondence between frames. Further, tracked objects can change shape or color over time, preventing correspondence even though the objects were properly extracted.

In addition, even under ideal conditions, single-view tracking systems invariably lose track of monitored objects that leave the field-of-view of the camera. When multiple cameras are available, as in many close-circuit television systems, it is theoretically possible to reacquire the target when it appears in a different camera. This ability to perform automatic "camera hand-off" is of significant practical interest.

SUMMARY OF THE INVENTION

In one aspect, the invention relates to a computerized method of video analysis that includes receiving several series of video frames generated by a number of image sensors. In one embodiment, the image sensor is a video camera. Each image sensor has its own field-of-view which can, but does not have to, overlap with another image sensor's field-of-view. The image sensors monitor a portion of a monitored environment. The computerized method also includes concurrently tracking, independent of calibration, multiple objects within the monitored environment as the objects move between fields-of-view, and multiple objects within one field-of-view. The tracking is based on the plurality of received series of video frames.

In one embodiment, the method of video analysis also includes tracking objects based on a probability that an object included in one video frame generated by a first image sensor at a first point in time will be included in a video frame generated by a second image sensor at a second point in time. In another embodiment, the method of video analysis includes storing a plurality of blob states over time. Each blob state includes a number of objects included in the blob and a blob signature. The method of video analysis can also store a plurality of transition likelihood values representing the probability that objects within one blob at one instant in time correspond to objects within other blobs at other instants in time. In one embodiment, the transition probabilities can be updated as new information is gleaned from subsequent video frames.

In one embodiment, the method of video analysis includes storing object data indicating correspondences between objects and blob states. The method can also include generating a tracking solution based on the blob states and transition probabilities.

In one embodiment, the method of video analysis includes generating tracking metadata. Tracking metadata can include, without limitation, object track data, tracking solutions, object feature data and field-of-view data. In another embodiment, the method further includes selecting a rule set to analyze the generated tracking metadata and evaluating the tracking metadata, based on the rule set, using a rules engine. Rule sets may include rules for monitoring parking lot security, detecting property theft, detecting hazards to children, monitoring public safety, and determining merchandizing and operations statistics.

In another aspect, the invention relates to a computerized system for video analysis which includes a receiving module configured to receive a plurality of series of video frames and a calibration independent tracking module in communication with the receiving module. The series of video frames are generated by a plurality of image sensors which monitor portions of a monitored environment and have a field-of-view. The tracking module is configured to both concurrently track a plurality of objects within the monitored environment as the objects move between fields-of-view and to concurrently track a plurality of objects within one field-of-view based on the plurality of received series of video frames. The tracking module also can output tracking metadata.

In one embodiment, the video analysis system also includes a rules engine, which is in communication with the tracking module and receiving the tracking metadata.

In another aspect, the invention relates to a system for monitoring parking lot security which includes a receiving module configured to receive a plurality of series of video frames and a calibration independent tracking module in communication with the receiving module. The series of video frames are generated by a plurality of image sensors which monitor portions of a monitored environment and have a field-of-view. The tracking module is configured to both concurrently track a plurality of objects within the monitored environment as the objects move between fields-of-view and to concurrently track a plurality of objects within one field-of-view based on the plurality of received series of video frames. The tracking module also can output tracking metadata. The system also includes a rules engine utilizing a parking lot security rule set configured to receive and evaluate the tracking metadata.

In another aspect, the invention relates to a system for property theft detection which includes a receiving module configured to receive a plurality of series of video frames and a calibration independent tracking module in communication with the receiving module. The series of video frames are generated by a plurality of image sensors which monitor portions of a monitored environment and have a field-of-view. The tracking module is configured to both concurrently track a plurality of objects within the monitored environment as the objects move between fields-of-view and to concurrently track a plurality of objects within one field-of-view based on the plurality of received series of video frames. The tracking module also can output tracking metadata. The system also includes a rules engine utilizing a theft detection rule set configured to receive and evaluate the tracking metadata.

In another aspect, the invention relates to a system for child hazard detection which includes a receiving module configured to receive a plurality of series of video frames and a calibration independent tracking module in communication with the receiving module. The series of video frames are generated by a plurality of image sensors which monitor portions of a monitored environment and have a field-of-view. The tracking module is configured to both concurrently track a plurality of objects within the monitored environment as the objects move between fields-of-view and to concurrently track a plurality of objects within one field-of-view based on the plurality of received series of video frames. The tracking module also can output tracking metadata. The system also includes a rules engine utilizing a child safety rule set configured to receive and evaluate the tracking metadata.

In another aspect, the invention relates to a system for property theft detection which includes a receiving module configured to receive a plurality of series of video frames and a calibration independent tracking module in communication with the receiving module. The series of video frames are generated by a plurality of image sensors which monitor portions of a monitored environment and have a field-of-view. The tracking module is configured to both concurrently track a plurality of objects within the monitored environment as the objects move between fields-of-view and to concurrently track a plurality of objects within one field-of-view based on the plurality of received series of video frames. The tracking module also can output tracking metadata. The system also includes a rules engine utilizing a public safety monitoring rule set configured to receive and evaluate the tracking metadata.

In another aspect, the invention relates to a system for merchandizing and operations statistical analysis which includes a receiving module configured to receive a plurality of series of video frames and a calibration independent tracking module in communication with the receiving module. The series of video frames are generated by a plurality of image sensors which monitor portions of a monitored environment and have a field-of-view. The tracking module is configured to both concurrently track a plurality of objects within the monitored environment as the objects move between fields-of-view and to concurrently track a plurality of objects within one field-of-view based on the plurality of received series of video frames. The tracking module also can output tracking metadata. The system also includes a rules engine utilizing a merchandizing and operations statistical rule set configured to receive and evaluate the tracking metadata.

In another aspect, the invention relates to a method of analyzing video data that includes receiving tracking metadata from a calibration-independent tracking module and analyzing the metadata using a regular expression representation of a specified pattern. An event is generated if a portion of the metadata exhibits the specified pattern. In one embodiment, the method also includes comparing the regular expression of the specified pattern to the portion of the metadata by utilizing a software implemented representation of a finite state machine.

BRIEF DESCRIPTION OF THE DRAWINGS

The foregoing discussion will be understood more readily from the following detailed description of the invention, when taken in conjunction with the accompanying drawings.

FIG. 7A includes schematic depictions of two series of video frames.

FIG. 7B includes two illustrative transition probability tables according to one embodiment of the invention.

FIG. 10 includes two illustrative data association matrices according to one embodiment of the invention.

DETAILED DESCRIPTION

In a surveillance system, cameras capture image data that depicts the interaction of people and things in a monitored environment. Types of cameras include analog video cameras, digital video cameras, or any device that can generate image data. The word "camera," is used as a generic term that encompasses any sensor that can output image data. In one embodiment, the CAS system observes a monitored environment through a number of input sensors although its primary sources of information are cameras. The majority of CCTV installations use common visible-light video cameras. In such installations, the CAS system employs advanced video analysis algorithms for the extraction of information from analog NTSC or PAL video. These algorithms, however, are not limited to the visible light spectrum; they can also be applied to infrared video or even imagery from radar or sonar installations if available.

Figure 1:
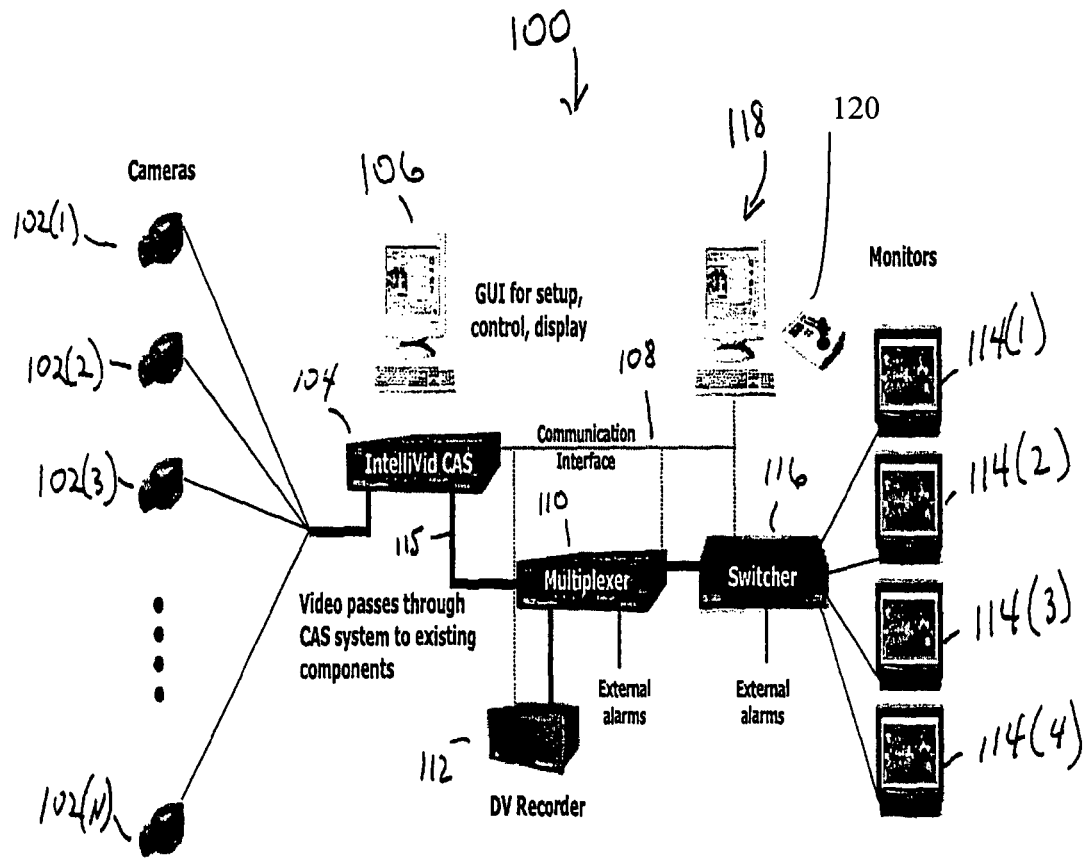
FIG. 1 is a block diagram of an illustrative overall computer-assisted surveillance ("CAS") system utilizing one aspect of the invention.

FIG. 1 shows an illustrative computer-assisted surveillance ("CAS") system 100. A plurality of cameras or other image input devices 102 provide image inputs to a computer 104 programmed to provide image analysis. CAS computer 104 can include a display 106 providing a graphical user interface for setup, control and display. CAS computer 104 can also include one or more user input devices (not shown) such as keyboards, mice, etc. to allow users to input control signals.

CAS computer 104 performs advanced image processing including image feature extraction and tracking. CAS computer 104 can automatically detect objects and activity and can generate warning and other information that can be transmitted over a digital communications network or other interface 108. CAS computer 104 also uses interface 108 to retrieve data, such as previously recorded video stored on recorder 112 or information stored on other computers. CAS computer 104 provides the outputs of the various cameras 102 to a multiplexer 110 for recording, typically continuous or stop-frame, by recorder 112 and for display on one or more displays 114 via a switcher 116. An additional user interface (e.g., provided by another computer 118 and user input including, for example, a joystick 120) can be used to allow an operator to control switcher 116 to select images to view and to control other parts of system 100 including CAS computer 104. Mutiplexer 110 and/or switcher 116 can respond to external alarms that occur when certain types of activity have been automatically detected (e.g., an alarm generated by a motion sensor) and record or display video appropriately. These alarms can also be generated by CAS computer 104 based on detected activities in the video streams.

The illustrative CAS Computer 104 system integrates seamlessly into any existing security infrastructure. The illustrative embodiment CAS system 100 is compatible with, for example, legacy analog video sources, in addition to newer digital video sources such as USB, FireWire, or IP cameras on wired or wireless networks. The CAS computer 104 acts as a passive repeater of its input signals, so that in the unlikely event of a CAS computer 104 failure, the remainder of the security infrastructure continues to function without the CAS computer 104.

While video cameras 102 are the typical primary sensors for the CAS system 100, the system can also accommodate other commonly-used sensors, such as motion detectors, smoke detectors, spill detectors, microphones, point-of-sale (POS) recordings, electronic article surveillance (EAS) systems, and access control systems. The illustrative CAS system 100 combines information from these sensors with the video analysis results to provide an even richer description of activities in the world. For example, POS information may be used with video images to verify that a customer purchased a particular product.

Figure 2:
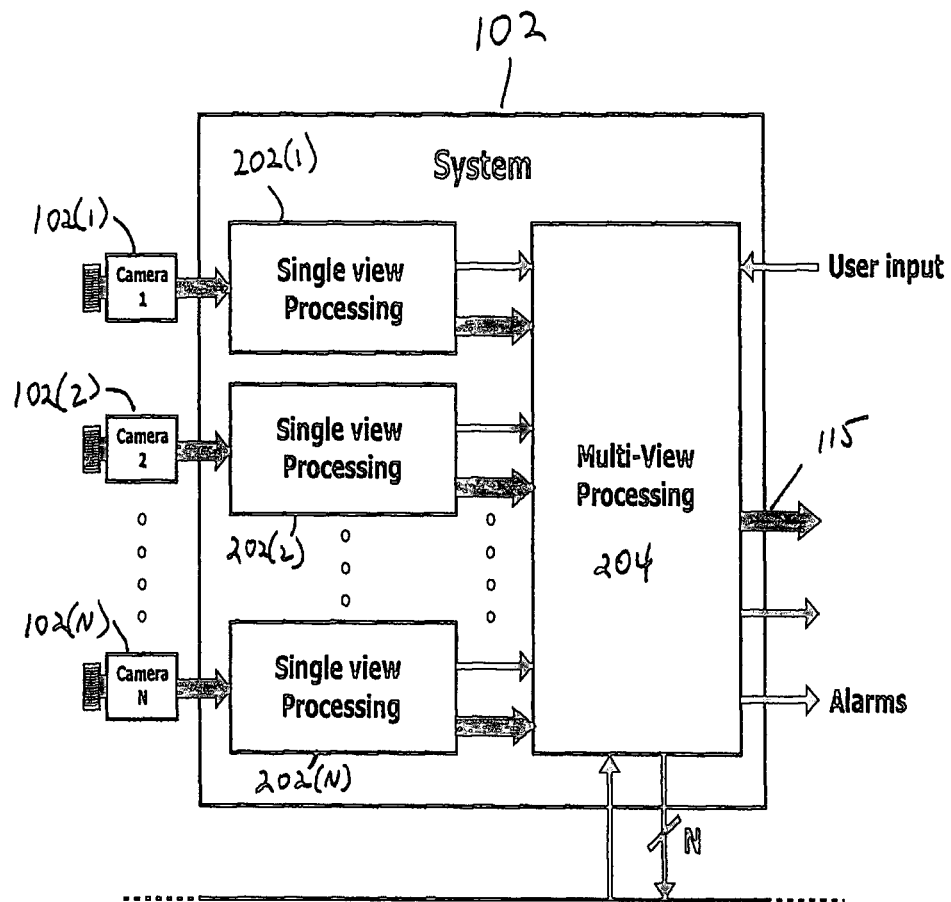
FIG. 2 is a high-level block diagram of an illustrative CAS computer according to one embodiment of the invention.

FIG. 2 shows a high-level block diagram of an illustrative CAS computer 104. For illustrative purposes, the computer components are grouped into two main classes: single-view processing blocks 202 (SVPs) and multi-view processing blocks 204 (MVPs). Each image input source is attached to a SVP 202. Image input sources include cameras 102 as well as a variety of storage devices including, for example, computer disks, VHS tapes, and digital videotapes. For purposes of data analysis, image data outputted by a video storage device is the equivalent of image data generated by a camera. Each SVP 202 typically performs video processing tasks that require only a single video stream. The outputs of the SVP 202 are connected to a MVP 204 that processes multiple video streams at once. Depending on the embodiment, a processing module includes a MVP 204, or a combination of one or more SVPs 202 and one or more MVPs 204. The CAS computer also includes memory modules (not shown) for receiving and storing incoming image data. The memory modules can be a part of the processing module, or they can be separate from the processing module.

The single-view processing components 202 and the multi-view processing components 204 typically analyze data as a series of video frames depicting a scene. In one embodiment, image data is analyzed directly from a camera. In another embodiment, the analyzed image data can originate from a storage device. Some cameras and video storage devices create and store image data on a frame-by-frame basis. Other storage systems may only store video frame updates, i.e. detected changes to the scene. To carry out analysis of image data, the CAS computer 104 constructs a video frame (e.g., with a frame grabber) from stored image data that may be stored in a variety of devices and formats.

Figure 3:
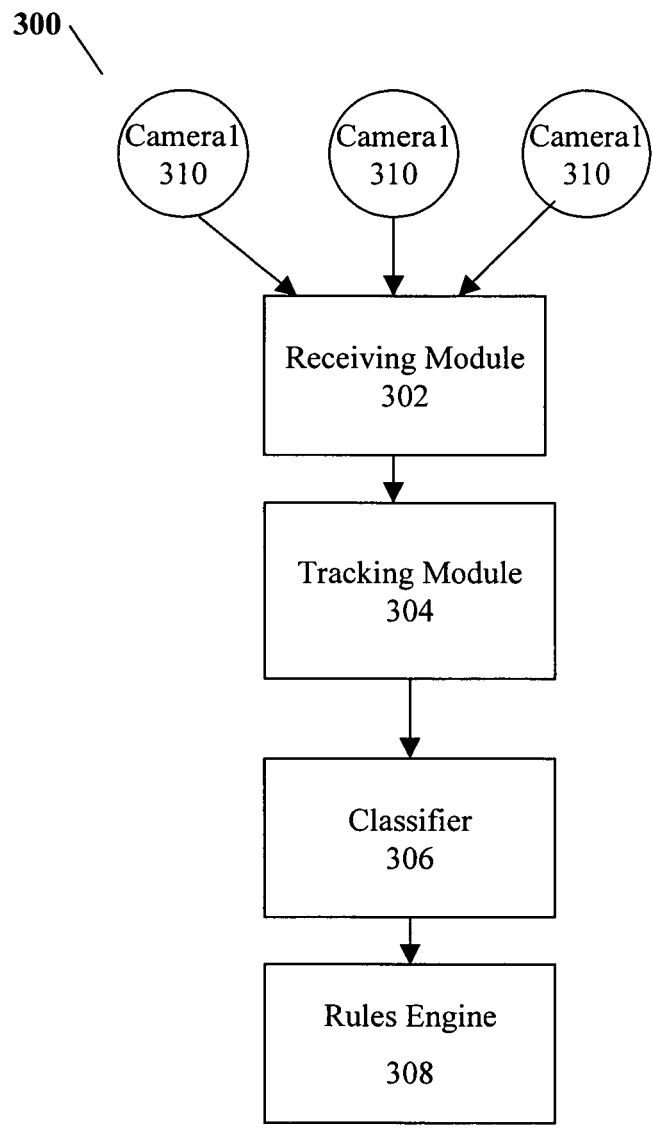
FIG. 3 is block diagram of a video analysis system according to one embodiment of the invention.

FIG. 3 is a block diagram of an illustrative video analysis system according to one embodiment of the invention. In this embodiment, the video analysis system 300 may include a receving module 302, a tracking module (also referred to as a "tracker") 304, a classifier 306, and a rules engine 308.

In one embodiment, the receving module receives a plurality of series of video frames from a plurality of cameras 310 (e.g., cameras 102 of FIG. 1). In the case that the video analysis system 300 is implemented on the CAS computer 104, described above, each series of video frames is forwarded to a respective SVP 202. In one embodiment, a central receiving module receives a plurality of series of video frames and distributes the series to a plurality of SVPs 202. In another embodiment, each SVP 202 has its own receiving module for a single series of video frames generated by a single camera 310. A receiving module 302 can include a data input port, such as a parallel port, a serial port, a firewire port, an ethernet adapter, a coaxial cable input, an RCA jack, an S-video jack, composite video jacks, a VGA adaptor or any other form of port for receiving video data.

The tracking module 304 is a logical construct that receives video data from a receiving module 302, and, in some embodiments, may concurrently track a pluarlity of objects both within a single camera 310 field-of-view and among multiple camera 310 fields-of-view. In some embodiments, the tracking module functionality is distributed among a plurality of processing elements. For example, in one embodiment implemented on the CAS computer 104, the functionality is distributed between the SVPs 202 and the MVP 204. In other embodiments, the functionality of the tracking module 304 is aggregated into a single processing element. The functionality of the tracking module 304, regardless of how it is distributed, can be implemented in either software or in hardware. The output of the tacking module 304 may be stored as tracking metadata in, for instance, a database (not shown).

In some embodiments, the system 300 may also include a classifier 306. The classifier can be an independent processing module, or its functionality can be combined within the tracking module 304 or rules engine 308. The information created by the classifier 306 may also be stored in a database. In some embodiments, the classifier 306 may perform two different types of classification, static classification and dynamic classification.

Static classification refers to a classification procedure that operates on a group of pixels from a single instant in time (i.e., from a single frame of video). This type of classification may include assigning instantaneous properties of the pixel group to the pixel group. These properties may include, for example, size, color, texture, or shape to determine if the group of pixels is interesting or not. It should be understood that the particular properties and threshold used to classify may vary depending on the specific environment in which the system is operating. This is also true for dynamic classification.

Dynamic classification refers to classification rules that examine a pixel group over a period of time to make a classification. Examples of dynamic classification properties include velocity, acceleration, change in size, change in area, change in color, lack of motion, or any property that includes some time dependence. These properties, and others, may be considered predetermined characteristics that may be evaluated by the rules engine 308.

Any classifier may be used in the present invention. A particularly useful classifier may operate as described below. The classifier 306 may include a first pass classifier that is used to remove noisy pixels and other artifacts or external variables. A second pass classifier is used in correlation with the output of the tracking module 304. This interaction includes but is not limited to any combination of spatial, temporal, image feature, and motion output from a tracking system. This classification of objects may be applied on a per frame basis. In more detail, the first pass classifier is used to filter out any pixel groups in an image which are visibly noise or remnants and determines, therefore that those pixel groups are not interesting. This basically is similar to a more conventional noise classifier approach. The classifier 306 may then rely on the tracking module to create a matching between every remaining pixel group and a certain object for each video frame. The second pass classifier then looks at the data from the tracking module 304 and compares it with data from other frames. Characteristics of followed objects are analyzed along with a state history of that particular object. In some embodiments, the classifier may keep an active memory of how a given object (now correlated to pixel group) was created. If that particular object has been seen on this or another camera in the past, all of its history is remembered. If an object is new, very little is known about it so any decisions the classifier makes will have a lower probability of correctness than an object that has been tracked for several frames. In some embodiments, various predetermined characteristics of the pixel group may help in the classification process. This example may include, for example: Motion information (has the object moved and, if so, how fast?); Grouping information; and Appearance/Signature information.

The system 300 may also include a rules engine 308. This optional rules engine is described in greater detail below. In general, however, the rules engine 308 evaluates tracking metadata to determine whether specific conditions have been met and may also allow users to search for specific information created by the tracking module 304 that, in some instances, may also been processed by the classifier 306.

Figure 4:
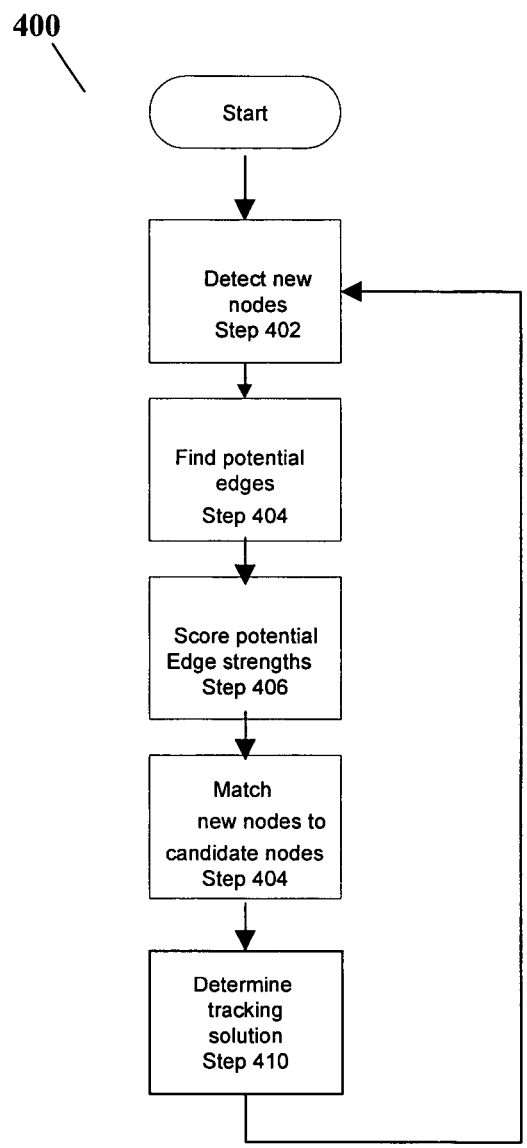
FIG. 4 is a flow chart that depicts an illustrative tracking methodology according to one embodiment of the invention.

FIG. 4 is a flow chart that depicts an illustrative tracking methodology 400 employed by the tracking module 304 according to one embodiment of the invention. In brief overview, in one embodiment of the invention, tracking 400 includes two steps, constructing a track graph representing the movement of "blobs" through a monitored environment, and solving the track graph to correspond the blobs to specific objects. A blob is a plurality of substantially contiguous pixels that are determined not to be part of the background of a video frame. To create a track graph, the tracking module 304 determines new nodes (step 402), determines possible edges connecting candidate nodes to the new nodes (step 404), determines the strength of the possible edges (step 406), and matches the new nodes to the candidate nodes (step 408). The tracking module 304 then determines a tracking solution (step 410). These steps will be decribed in greater detail with reference to FIGS. 5-13.

Figure 5:
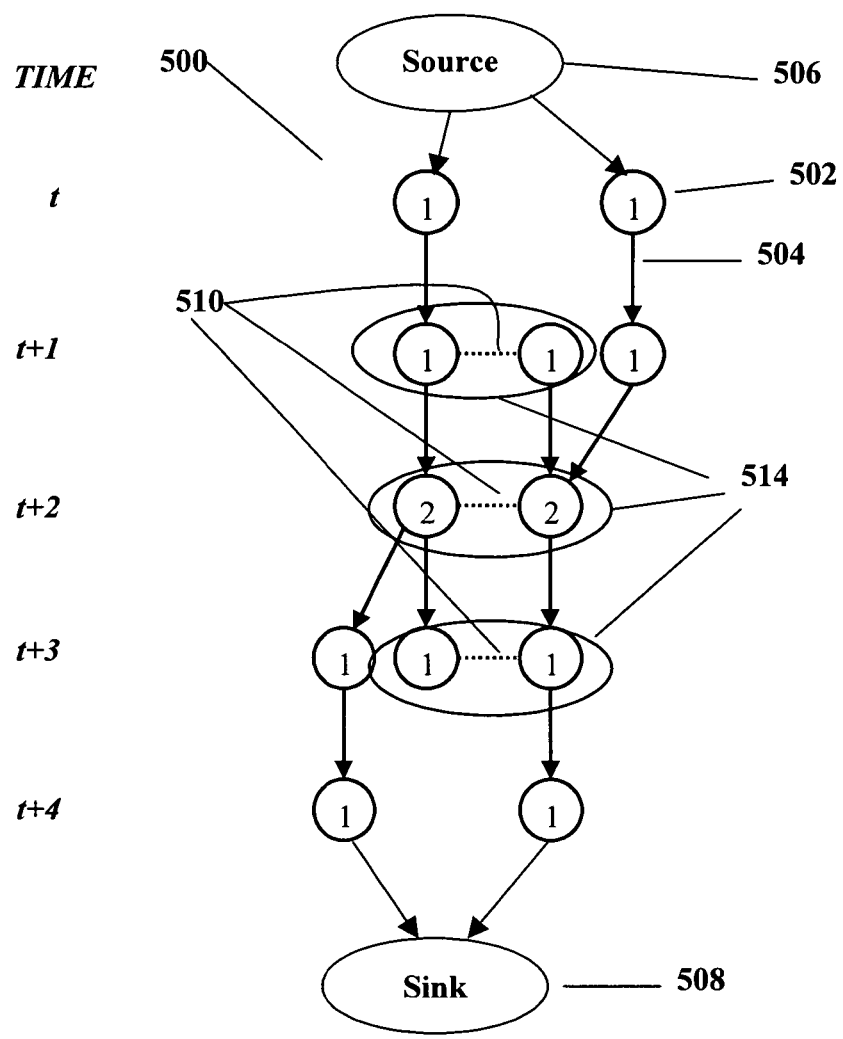
FIG. 5 is an illustrative track graph according to one embodiment of the invention.

FIG. 5 shows an illustrative data structure referred to as "track graph" 500, that may be used by the tracking module 304 in carrying out its tracking functionality 400. Of course, other data structures or methods of tracking may be used. In general, a track graph 500 records observations of blobs from multiple image sensors for a substantially long period of time. In some embodiments, the track graph 500 records blob observations for the entire time the tracking module 304 monitors a monitored environment. Since blob data is stored for a substantially long period of time, a tracking algorithm operating on a track graph 500 can use information far in the past rather than, for example, just from the previous frame. In one embodiment, at least some information in the track graph 500 never changes, only the interpretation does (e.g., as new information is added). In this way, decisions made by the tracking module 304 using the track graph 500 can be "undone" or changed without losing information. As discussed above, information created by the tacking module may be stored in a database as metadata.

Specifically, the track graph 500 consists of nodes 502 and edges 504. Nodes 502 represent the appearance of an object or group of objects in an image sensor. Each node 502 corresponds to the state of a blob at an instant in time (e.g., in a single video frame) or over a period of time (e.g., a sequence of video frames). A blob could represent one or more objects, and, conversely, a single object may correspond to one or more blobs. For example, if a number of persons are standing closely together, blob extraction may only detect a single continuous blob that includes all of the persons. Similarly, if a monitored person stands behind an obstruction, such as a railing, that only partially obstructs a camera's view of the person, the person might appear to a CAS camera as two blobs on either side of the obstruction. Edges 504 connect together nodes 502 and represent possible trajectories that objects may have taken through the monitored environment. Edges 504 are directed and point from older nodes 502 to newer nodes 502. In one embodiment, older nodes 502 are nodes that appear above newer nodes in a track graph 500. For example, in track graph 500 nodes at time t are older than nodes at time t+2.

In the example track graph 500, each node 502 and edge 504 is annotated with a number. In the case of nodes 502, the number represents the number of objects at that node 502 (the "node count"). In the case of edges 504, the number represents the number of objects "moving" along that edge 504 to the next node 502 (the "edge 504 count"). For a track graph 500 to be consistent, these numbers may need to satisfy certain properties. First, the number of objects entering the most recently detected nodes 502 may need to equal the number of objects leaving previously existing nodes 502. Second, for a newly detected node, the number of objects at a node 502 may need to equal the sum of the number of objects entering the node 502. In some embodiments, the number of objects entering the most recently detected nodes 502 must equal the number of objects leaving previously existing nodes and the number of objects at a node 502 equals the sum of the number of objects entering the node. When annotated in this way, the track graph 500 has many of the properties of a "flow graph," which is a commonly studied graph in computer science. In one embodiment, multiple connected consecutive nodes which each only have single edges leaving the nodes can be combined into one node with an associated duration equal to the number of nodes combined.

The track graph 500 can also includes at least one source node 506 and at least one sink node 508. Source nodes 506 are nodes 502 that have no incoming edges 504, and sink nodes 510 are nodes 502 that have no outgoing edges 504. Source and sink nodes 506 and 508 generally correspond to the beginning or end of the track graph 500, or the beginning and end of an object in the track graph 500, such as an entrance or exit of a monitored environment.

Some edges, referred to as alias edges 510, are used to connect two nodes 502 that represent the same physical object. Alias edges 510 connect nodes 502 corresponding to objects concurrently included in the fields-of-view of multiple cameras and nodes in a single video frame if the nodes 502 correspond to the same object (e.g., an object divided by a pole). Nodes 502 connected by alias edges 510 essentially become a single node 502 (referred to as a "supernode" 514). The edges 504 into and out of a supernode 514 are the union of the edges 504 into and out of the constituent nodes 502. In some embodiments, alias edges 510 do not enter into any calculations (such as flow calculations), and flow constraints apply to the supernode 514 as a whole rather than the individual nodes 502.

In general, it is useful to store various data at the nodes 502 and edges 504 of the track graph 500, for example, the edge and node counts, described above. In addition, in some embodiments, an "edge 504 strength" is stored in association with an edge 504. An edge strength is a real number that represents the likelihood of an edge 504 being correct. In one embodiment, the strength is constrained to be between 0 and 1, and represents the probability that a blob transitioned from an older node 502 to a newer node 502. In other embodiments, the track graph 500 stores the log of such a transition likelihood.

With respect to nodes 502, in addtion to the node count, in one embodiment, the tracking module 304 stores a variety of information about the blob and/or object(s) to which the node 502 corresponds. The node 502 stores the duration (e.g., seconds or number of frames) that the node 502 has existed, an identification of the camera that generated the video frame(s) that includes the blob that corresponds with the node 502, and the location(s) of the corresponding blobs in the video frames. In other embodiments, nodes 502 also contain additional properties about the blob/object(s) included in the node 502, such as the size, color histogram, velocity, acceleration, classification information (e.g., human vs. car), etc. of the object(s). The stored properties, taken together, are referred to as the signature of the blob, and can be used to make decisions during the tracking process.

Figure 6A:
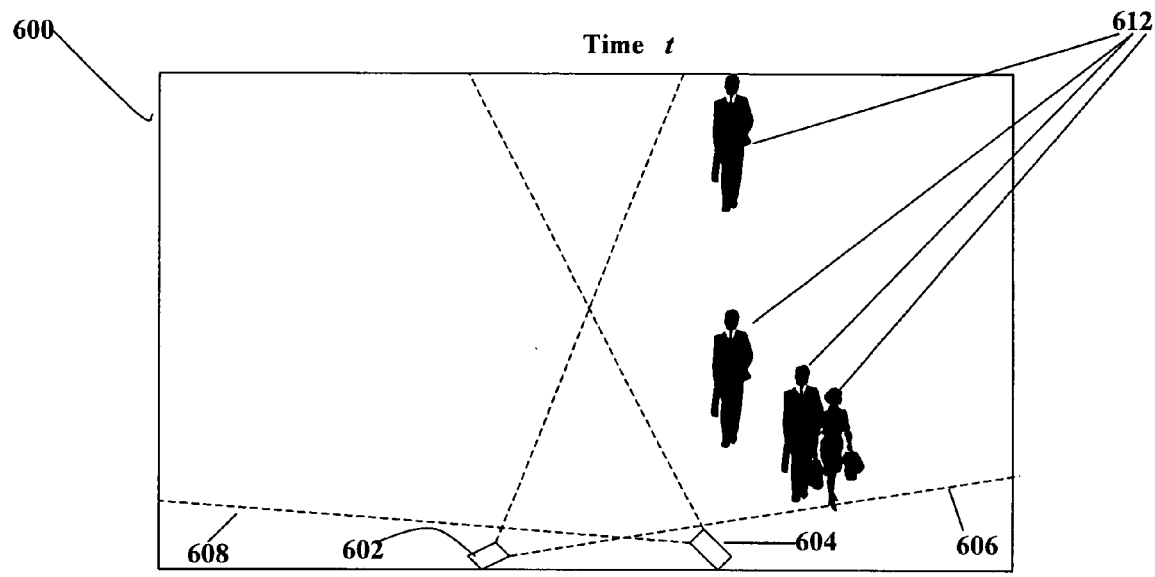
FIGS. 6A and 6B are schematic depictions of a monitored environment.
Figure 6B:
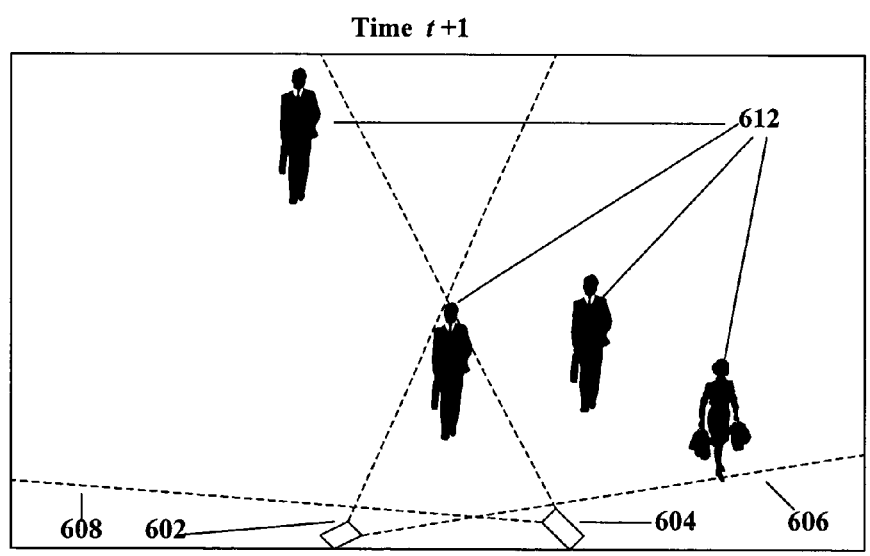

FIGS. 6A-6B are schematic depictions of a monitored environment 600 at times t and t+1, respectively. The monitored environment includes two cameras 602 and 604. Each camera has its own field-of-view 606 and 608. The fields-of-view 608 and 610 overlap in one overlapping area 610 of the monitored environment 600. The monitored environment 600 also includes four objects, 612, which are moving through the monitored environment 600 from time t to time t+1.

FIG. 7A includes schematic depictions of the two series of video frames 702a-b and 704a-b generated by the cameras 602 and 604, respectively, in the monitored environment 600, at times t and t+1. The first video frames 702a and 704a were generated at time t, and the second video frames 702b and 704b were generated at time t+1. Video frame 702a is empty. Video frame 704a includes three blobs $706a_1$-$a_3$. Video frame 702a includes two blobs $706b_1$ and $706b_2$. Video frame 704b also includes three blobs $706b_3$-$b_5$.

Figure 8:
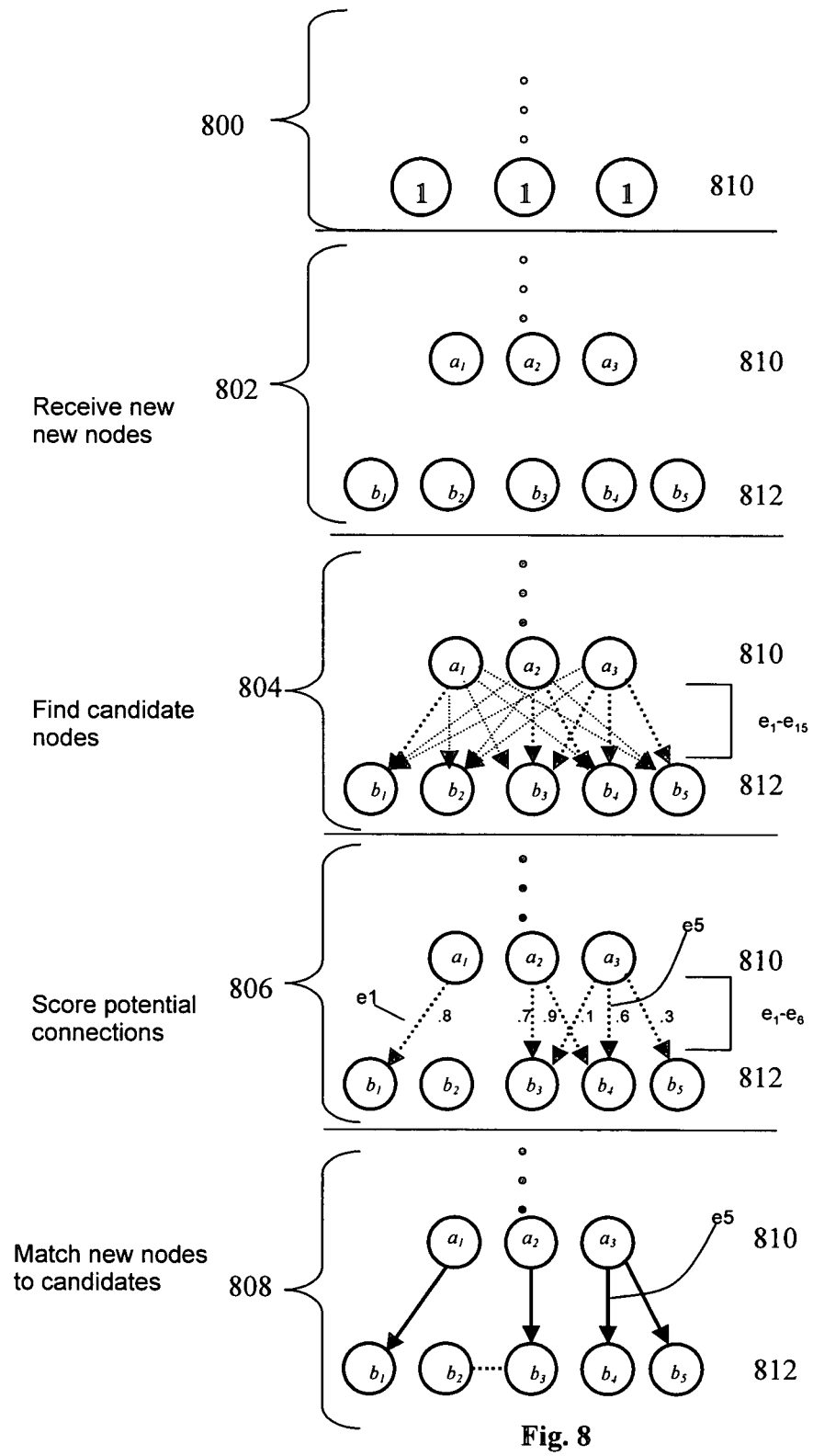
FIG. 8 is a series of schematic depictions of partial track graphs according to one embodiment of the invention.

FIG. 8 includes illustrative partial track graph updates 800, 802, 804 and 806 demonstrating the construction of the track graph 808 that that is created by the tracking module 304 as it applies the tracking methodology 400 to the series of video frames 702 and 704, according to one embodiment of the invention. The partial track graph 800 depicts the lowest level of the track graph at time t. The partial track graph 800 includes three nodes $810a_1$-$a_3$, i.e., one node for each blob $706a_1$-$a_3$ included in video frames 702a and 704a. For illustrative purposes, it will be assumed that the node counts for the nodes $810a_1$-$a_3$ are all equal to one.

Upon receiving video frames 702b and 704b, the tracking module 304 adds new nodes 812b to the track graph 800 (step 504). The tracking module 304 analyzes the video frames 702b and 704b to detect blobs. The tracking module 304 adds new nodes 812 (e.g., new nodes $812b_1$-$b_5$) to the track graph 800 to correspond to the detected blobs $706b_1$-$b_5$, resulting in partial track graph 802. Nodes $810a_1$-$a_3$, no longer being the newest nodes, are now considered candidate nodes.

The tracking module 304 finds potential edges $814e_1$-$e_{15}$ that could connect the new nodes $812b_1$-$b_5$ to candidate nodes $810a_1$-$a_3$ (step 504), as depicted in partial track graph 804. After the possible edges $814e_1$-$e_{15}$ are added to the track graph (step 504), the tracking module 304 determines the edge strengths for the possible edges $814e_1$-$e_{15}$ between the candidate nodes $810a_1$-$a_3$ and the new nodes $812b_1$-$b_5$ (step 506). In one embodiment, the tracking module 304 determines the strength of edges that connect candidate nodes from one camera's field-of-view to new nodes from that same camera's field-of-view (e.g., edge $e_5$) by using predictive tracking techniques known in the art, such as applying a Kalman filter. To take into account the possibility that the new blobs in a camera's field-of-view may correspond to a candidate node in a second camera's field-of-view, the tracking module 304 determines the strength of edges connecting nodes from different camera fields-of-view (e.g., edge $e_1$), refferred to as trans-camera edge strengths.

In one embodiment, the tracking module 304 determines trans-camera edge strengths using a dynamic field-of-view relationship determination technique as described in U.S. patent application Ser. No. 10/660,955 (referred to hereafter as the "'955 application"), entitled "Computerized Method and Apparatus for Determing Field-of-View Relationships Among Multiple Image Sensors," filed on Sep. 11, 2003. Among other things, the '955 application describes determining a pluarlity of probabilities and statistical values relating to observations of object appearances in video frames generated by a pluarlity of cameras. The probabilities include, for example, the probability that an object is seen in a first location i, $p_i$, the probability that an object is seen in a second location j, $p_j$, and the probability that an object is seen in location i followed by an object being seen in location j after a period of time $\Delta t$, $p_{ij}(\Delta t)$. The statistical values include the lift and correlation coefficients between image regions of video frames generated by the same or different cameras over various time periods $\Delta t$.

Trans-camera scores can be based on the lift values, the correlation coefficients described in the '955 application, or on a transition probability calculated based on the probabilities described therein. In one embodiment, the transition probability is defined as:

$$p_{trans(i,j)}(\Delta t) = \frac{-(1-p_i-p_j) + \sqrt{(1-p_i-p_j)^2 - 4(p_i p_j - p_{ij}(\Delta t))}}{2} \quad (1)$$

FIG. 7B includes illustrative transition probability tables determined for a subset of the image regions included in video frames 702 and 704. The first table 708 includes the transition probabilities between pairs of image regions at $\Delta t=0$, i.e., the probability that blobs concurrently seen in the two image regions correspond to the same object. For example, the transition probability between image regions A2 and B2 at $\Delta t=0$ is 1 indicating that those image regions correspond to the overlapping area 610. Nodes corresponding to blobs in such image regions are joined with an alias edge 510 to form a super node 514. The second table 710 includes the transition probabilities between pairs of image at $\Delta t=1$, i.e., the probability that a blob corresponding to an object in a first frame will correspond to a blob in a second frame one time instant later. For example, the transition probability between A1 and B1 at $\Delta t=1$ is 0.8, indicating, for example that objects are highly likely to move from image region B1 to image region A1 one time instant later. In one embodiment, the trans-camera edge strength is equal to the transition probability at $\Delta t=1$. In other embodiments, the transition probability is one factor used in calculating the trans-camera edge strength.

The above described trans-camera edge strength determination techniques are based on the analysis of appearances of objects within video frames over time, and not on the calibration of the cameras, or on a fused or calibrated scene. Therefore, the tracking module can determine trans-camera edge strengths independent of camera or environment calibration. If the cameras or the scene are calibrated, however, such information can be used. However, calibration data is unnecessary to provide satisfactory tracking results. Because calibration is unnecessary (but could be included), a tracking module operating as described above may be referred to as "calibration-independent."

In the illustrative embodiment, if the edge strength for a give edge is below a threshold (e.g., <0.1), the tracking module 304 immediately removes the edge from the track graph. Partial track graph 806 illustrates the state of the track graph after the edge strengths have been calculated (step 406) and highly unlikely edges are removed.

Based on the edge strengths, the tracking module 304 matches the new nodes 810 with the candidate nodes 812 (step 408). The matching process is similar to the standard abstract data association problem. In the standard abstract data association problem, two sets, A and B, contain objects to be matched. Each object in A is allowed to map to one object in B and vice versa. Each potential match (a, b) has a score associated with it, and some potential matches may be disallowed. The task is to find a set of matches that satisfies these constraints and has a maximum (or minimum) score. The problem is commonly visualized as a matrix, with the elements of A corresponding to columns and the elements of B corresponding to rows. X's denote disallowed matches. A valid matching (denoted with circles) includes only one element from each row and column. This standard data association problem is well-known, and it can be solved efficiently.

Standard data association problem solutions, however, cannot readily be applied in the video surveillance context. In the video surveillance context, the objects to be matched are blobs (represented by nodes). Single nodes from one set can, and often do, correspond to multiple nodes in a second 810 set, and visa versa. For example, considering FIGS. 6A, 6B, 7A, and 7B, blob $706a_3$ node $a_3$ in video frame 704a corresponds to two objects, a man and a woman. At time t+1, the two objects have separated and the tracking module 304 detects two blobs 706, instead of one. As a result the track graph updated for time t+1 includes two nodes $812b_4$ and $812b_5$ that that the tracking module 304 should determine to correspond to candidate node $a_3$. In general, a group of individuals, considered by the tracking module as a single node, may split, resulting in several nodes. Similarly individuals can converge into group, resulting in a single new node corresponding to several candidate nodes. The video surveillance data association problem should handle one-to-many, many-to-one, and many-to-many correspondences.

Figure 9:
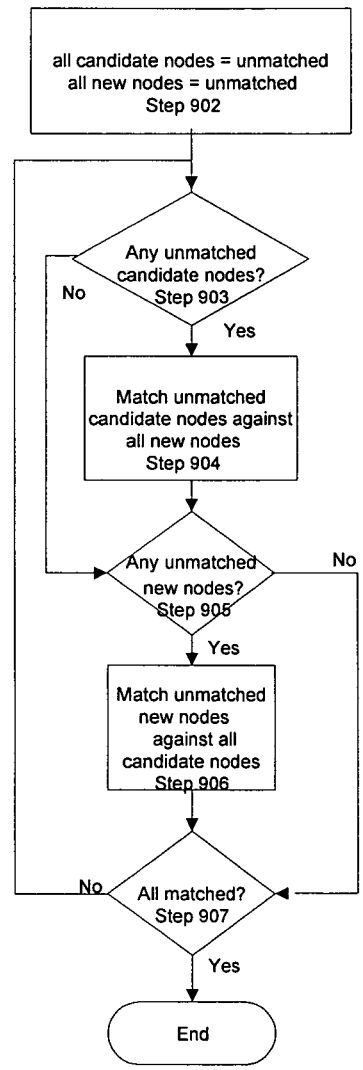
FIG. 9 is a flow chart of a method of determining node matches according to one embodiment of the invention.

FIG. 9 is a flow chart of one illustrative method of solving the video surveillance data association problem, i.e., determining node matches (step 408), according to one embodiment of the invention. At the beginning of the association problem, no new nodes 812 have been matched with candidate nodes 810 (step 902). Unmatched candidate nodes 810 are then matched with new nodes 812 (step 904) using a standard data association solution, where the edge strengths are used as matching scores. If any new nodes 812 are still unmatched after initial attempts to match the new nodes 812 to candidates nodes 810 (step 905), the tracking module 304 executes the data association algorithm on a smaller set of data that only includes edge strengths between the unmatched new nodes 812 and all the candidate nodes 810 (step 804). If any candidate nodes 810 or new nodes 812 remain unmatched (step 907), the tracking module 304 returns to step 802 and runs the data association algorithm only taking consideration of the unmatched candidate nodes 810. The process continues untill all candidate nodes and new nodes have been matched. If a new node cannot be matched to a corresponding candidate node 810, the tracking module 304 links the new node 812 to a source node 506 or to another new mode through an alias edge. Similarly, if a match cannot be found for a candidate node 810, in one embodiment, the candidate node is linked to a sink node 508. In another embodiment, the tracking module attempts to match the unmatched candidate node 810 to new nodes 812 received over a predetermined number of subsequent time instants before the candidate node 810 is linked to the sink node 508. In one embodiment, after all nodes are matched, edges 814 that correspond to unselected matching pairs are removed from the track graph 806.

FIG. 10A is a matrix 1000 that depicts an initial solution to matching the new nodes $812b_1$-$b_5$ with the candidate nodes $810a_1$-$a_3$ according to step 904. Cell values in the matrix 1000 correspond to the strength of edges $814e_1$-$e_6$ connecting the nodes. Note that new nodes $812b_3$ and $b_4$ are matched to candidate nodes $810a_2$ and $a_3$, respectively, even though the edge strength between $810a_2$ and $812b_4$ is larger than the selected edge strengths. The selection, however, leads to a higher total score, i.e., 2.1, for the set than if $810a_2$ were matched $812b_4$ and $810a_3$ were matched with $812b_5$ (the next highest edge score after $812b_4$), i.e., 2.0. The data association solution depicted in matrix 1000 has left new nodes $812b_2$ or $812b_5$ without matching candidate nodes.

No edges connect to new node $812b_2$, indicating that it either represents a new object, originating from a source node, or that it corresponds to a node in an overlapping image region from another camera. As mentioned above, the transition probability between image region A2 and image region B2 at Δt=0 is 1, indicating overlap. As a result, an alias edge is added to the track graph 808 to connect new nodes $812b_2$ and $812b_3$ (a node located in that overlapping image image region).

FIG. 10B is a matrix 1002 that depicts a solution to the secondary node matching step (step 906) that matches unmatched new nodes to candidate nodes. Node $812b_5$ is the only unmatched new node 812, and the tracking module 304 matches node $812b_5$ to candidate node $810a_3$. After all candidate nodes 810 and new nodes 812 are matched, unselected edges $814e_1$-$e_{15}$ are removed from the track graph 806, yielding the updated track graph 808.

Referring back to FIG. 4 and FIG. 5, based on a track graph 500, the tracking module 304 determines a tracking solution (step 410). The track graph 500 includes nodes 502 and possible links between the nodes over a period of time (i.e., edges 504). The track graph 500 does not track specific objects. For example, as objects converge and diverge as they move through a monitored environment, so too do the nodes 502 that correspond to those objects. In terms of a track graph 500, an object is a path through the track graph 500. In one embodiment, paths start at a source node 506 (where objects are "created" or enter) and end at a sink node 508 (where objects are "destroyed" or exit). If the track graph 500 is incomplete (e.g., it is being constructed from live video), then the partial paths may not end in sink nodes 508.

A solution to the track graph 500 is a set of paths that satisfy the flow properties of the track graph 500 described above. Each path in the solution represents a different object that has been observed. In one embodiment, to reduce the size of the solution space, a number of constraints are applied. First, the size of the solution (in terms of the number of objects) is required to be minimum. That is, the number of paths is limited to the minimum number required to explain all edges 504 with greater than a certain edge weight (e.g., 0.1). Second, the solution is required to be "optimal." Each path in the solution can be assigned a score that measures its likelihood (or, equivalently, a cost that measures its unlikelihood). In one embodiment, an optimal solution maximizes (minimizes) the sum of the scores (costs) over all paths. In another embodiment, an optimal solution maximizes (minimizes) the average of the scores (costs) over all paths. Even with these constraints, more than one minimal, optimal solution may exist. In these cases, simply finding one solution is sufficient. Any errors in the chosen solution can be corrected later by the user if needed.

The tracking module 304 can operate in real-time, or in a forensic mode. In forensic operation, the tracking module analyzes previously recorded video (e.g., from a video cassette or a digital video recorder, etc.) of a monitored environment. If the tracking module 304 is tracking objects in real-time, the tracking module can update the tracking solution after the track graph construction process (steps 402-408) is completed for each time instant analyzed, or the tracking module 304 can update the the track graph 500 periodically (e.g., every 2, 5, 10, etc. time instants). For forensic tracking, the tracking module 304 can build the entire track graph 500 before determining a tracking solution.

As finding the true optimal solution for all but the smallest track graphs is an intractable problem, the tracking module 304 utilizes heuristic algorithms for approximating optimal solutions Although computing the optimal solution is intractable, computing the size of the optimal solution (i.e., the number of paths) can be done efficiently. This algorithm is described in the next paragraph, followed by two algorithms for approximating optimal solutions.

The algorithm for counting objects relies on a property of minimal solutions: each path in a minimal solution must contain at least one edge that is not shared with any other path. That is, each path in the minimal solution must contain at least one edge with an edge count of 1. If a minimal solution did contain a path that violated this property, then one could remove a copy of this path from the solution (reducing the edge counts along the path by 1), resulting in a smaller solution. Thus, the original solution was not minimal.

Figure 11:
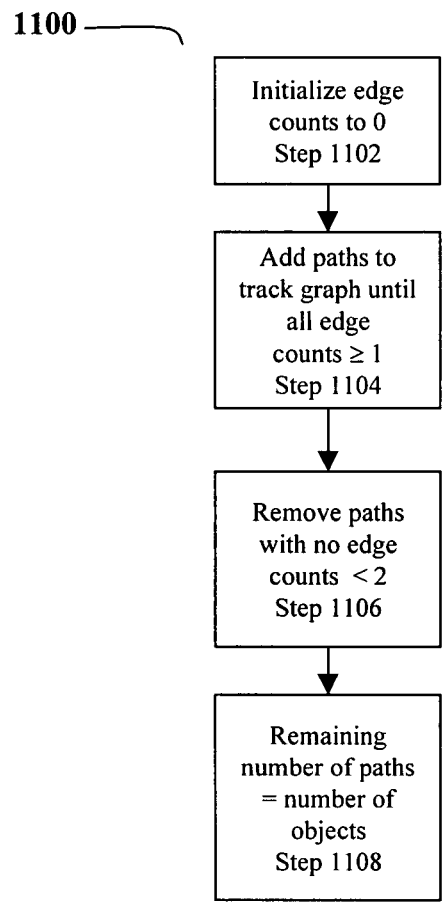
FIG. 11 is a flow chart of a method for counting objects in a monitored environment according to one embodiment of the invention.

FIG. 11 is a flow chart of a method 1100 of counting the number of objects in a track graph 500. The tracking module 304 initializes the edge counts of the track graph 500 to 0 (step 1102). The tracking module 304 then adds paths to track graph 500 until all edge counts are greater than or equal to 1 (step 1104). The tracking module 304 then removes paths that do not contain at least one edge with an edge count equal to 1 until it is no longer possible to do so (step 1106), that is, until all paths include at least one edge with an edge count equal to 1. At this point, the paths satisfy the minimal solution property, and the number of paths is the desired answer (the size of the minimal solution) (step 1108). In one embodiment the number of paths, if not known explicitly, can be found by summing the number of paths leaving each source node 506 in the track graph 500.

Figure 12:
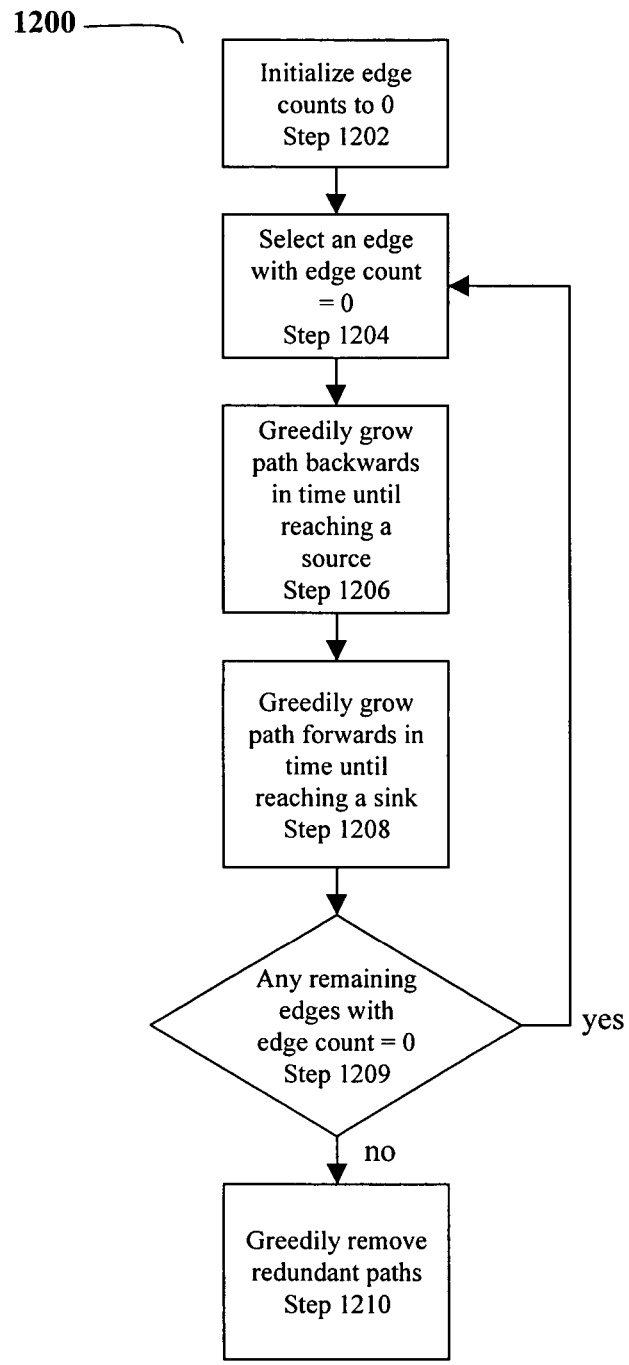
FIG. 12 is a flow chart of a method of determining a tracking solution according to one embodiment of the invention.

FIG. 12 is a flow chart of an illustrative method of tracking an object based on a track graph 1200. The method 1200 is similar to the above described counting algorithm. The basic approach is the same: add paths to the solution until all edges 504 have an edge count greater than 1. Then paths are removed until the minimal criterion is achieved. The difference is in deciding which paths are added and removed. In the counting algorithm, any valid path could be added or removed. However, in the case of trying to find an "optimal" solution, the decision of which paths should be added or removed is based on path costs.

In one embodiment, the cost of a path is defined in terms of the signatures in its constituent nodes. As described above, data related to several properties of blobs are stored in the nodes corresponding to those blobs. The properties can include, color, size, velocity, acceleration, etc. A low-cost path contains nodes whose signatures are similar. A high-cost path contains nodes whose signatures are dissimilar.

Measuring the similarity/dissimilarity of a pair of signatures depends on the particular representation of the signature. In one embodiment, blob properties are treated as feature vectors (i.e., arrays of numbers). A single feature might be described with multiple numbers (e.g., the average color may be represented with three numbers: red, green, and blue). Similarity can be measured by the distance (often Euclidean distance or Mahalanobis distance) between the feature vectors in high-dimensional space (e.g., 3-dimensional in the case of RGB colors, 4-dimensional if size is considered, as well, etc.). A small distance implies similarity and a large distance otherwise. In another embodiment, for signatures with multiple features, the distances between vectors representing each feature are combined (e.g., added or averaged) to arrive at a single distance. Similarity can also be measured by the dot-product of the feature vectors. A larger dot-product corresponds to a greater similarity. In one embodiment, to improve the robustness of the signature comparison of signatures including many features, some features that have large distances are ignored. For example, if a signature has 15 different features, then the 2 "worst" matching features could be ignored in a comparison.

The cost of a path can be measured by combining (e.g., adding or averaging) the costs of all pairs of signatures in the path. This procedure could become computationally prohibitive for long paths, so a simpler approach is to average the costs of pairs of adjacent nodes in the path. Alternatively, one could average the costs of nearby adjacent nodes in the graph.

Given a way of scoring paths, the algorithm proceeds as follows. The tracking module 304 initializes the track graph's 500 edge counts to 0 (Step 1202). The tracking module 304 creates a new path by selecting a starting edge. In the illustrative embodiment, the tracking module selects a starting edge with an edge count equal to 0 (step 1204). The starting edge and the nodes that the starting edge connects form an initial path. The tracking module 304 adds to the path using a greedy decision rule. That is, when adding edges to the path, the lowest cost edges are added first. Paths are "grown" from the starting edge by adding nodes 502 that result in the lowest cost path. Nodes 502 are added incrementally to the beginning (step 1206) and end of the path (step 1208). At any point at which there is a decision to make (i.e., more than one edge leave or enter a node 502), the tracking module 304 computes the cost of adding each node 502, and the tracking module 304 selects the node 502 that adds the minimun cost to the path. The tracking module 304 adds nodes 502 in this way until the path reaches a source and a sink. In one embodiment, multiple nodes 503 are added at a time. In this case, the algorithm considers the cost of adding all of the nodes 502 as a whole. Adding multiple nodes 502 has the advantage that a single poorly matching node 502 cannot cause the path to divert to even poorer matching nodes 502. After a given path is completed, the tracking module 304 determines whether any edges 504 remain with edge counts less than one (step 1209). If there are any such edges 504, the traker 304 repeats the process (steps 1204-1208) until all edge counts are greater than 0.

Once all edge counts are greater than zero, excess paths may need to be removed. Each path has a cost, and the paths can be sorted in order of decreasing cost. Redundant paths (i.e., those having no edge counts equal to 1) are removed in order of decreasing cost until no redundant paths remain (step 1210). After all redundant paths are removed, each remaining path corresponds to an object that was included in the monitored environment at some point in time. After a solution set is determined, the track graph 500 is updated to include the appropriate edge and node counts.

Figure 13:
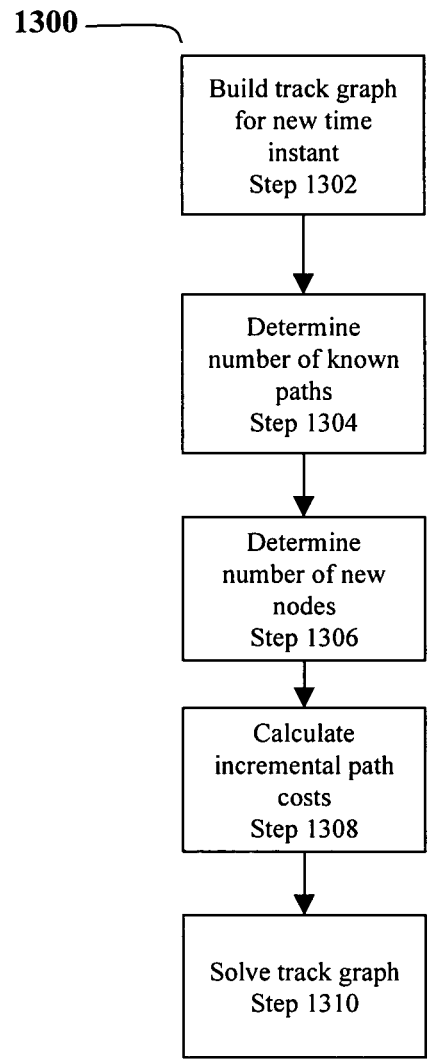
FIG. 13 is a flow chart of another method of determining a tracking solution according to one embodiment of the invention.

FIG. 13 is a flow chart of another method 1300 of determining a tracking solution. In the method 1300, the tracking module 304 derives a tracking solution incrementally, using a data association solution algorithm similar to the one described above with respect to matching new nodes 812 to candidate nodes 810. For illustrative purposes, referring back to FIGS. 4 and 8, upon completion of the track graph 808 for video frames received at time t+1 (steps 402-408) (step 1302), the tracking module 304 solves the newly updated track graph 808 (step 410/steps 1304-1310). The tracking module 304 determines the currently known number of paths, N, in the track graph 808 (i.e., the sum of the node counts at time t) (step 1304). The tracking module 304 then determines the number of new nodes 812, M, which have been connected to the track graph 808 (step 1306). The tracking module 304 calculates the incremental path costs associated with adding each node 812$m$ to each path n that m is connected to by an edge (step 1308). The tracking solution problem can be set up as an N×M data association problem and solved (step 1310) in the manner discussed previously (see method 900); however, instead of using edge scores and candidate nodes to solve the data association problem, the tracking module 304 uses the calculated incremental path costs and paths $n_r$.

After solving the data association problem, it is possible that a single path matches to more than one new node 812. For example, referring back to FIG. 8, the node counts for nodes 810$a_1$, $a_2$, and $a_3$ were all 1 at time t, indicating the existence of only three paths. At time t+1, however, the path passing through node $a_3$ matches to nodes 812$b_4$ and $b_5$. In such cases, a new object needs to be created for each additional node detected, as a single object cannot be in multiple places at once. A new object is assigned a path corresponding to the old object's path plus the new node 812 that matched it. The prior node counts and edge counts are updated to indicate the additional object traversing the path. The case in which multiple paths match with a single node 812 simply means that those objects coincide at that point in time and no special treatment is necessary other than assigning the single node a node count equal to the number of paths matching the node.

In another embodiment, it is possible to consider more than one new time instant, (i.e., multiple levels of nodes) in determining a solution. In such embodiments, all possible subpaths (chains of new nodes connected by edges) must be enumerated. The subpaths are then input to the data association problem instead of the single nodes. The matching algorithm, then proceeds as previously described above. Considering small sub-paths, as opposed to single nodes, is more resilient to anomalous nodes that would otherwise cause an incorrect decision to be made.

In another embodiment, the tracking module calculates matches using sub-paths, but the tracking module only adds a portion of a matched sub-path to a given known path. In the next iteration of the algorithm (i.e., when new nodes are available for matching), new sub-paths are formed from the new nodes and the previous nodes that were not added to the object paths. This approach provides the algorithm with some "look ahead" capability but does not commit to large increases in the paths prematurely. In another embodiment, a user can select both the size of the sub-path to be analyzed and the number of nodes from the analyzed sub-paths to add to the already known paths (e.g., look ahead 3 time instants, add one node). It is possible to use these look ahead approachs in the greedy path determination method 1200, as well.

In one embodiment, a separate data structure, referred to as an object store, stores tracking metadata corresponding to each object within the monitored environment, including the path the object follows through the track graph. The object store maintains one entry for each object or path tracked by the tracking module 304. Other tracking metadata may include, without limitation, the size, color, velocity, and acceleration of the object over time. Further tracking metadata may include classifications assigned by the classifier. The tracking module 304 can output any or all of the tracking metadata to a classifier or to a rules engine for further analysis.

The previous description related generally to a CAS system and was directed primarily to the operation of the tracking module. The following description relates to ways in which the tracking metadata produced by the tracking module and the classifier may be used to provide real-world functionality. To that end, in one embodiment, the CAS system described herein may include the capability to search metadata created by the tracking module by use of a rules engine.

Figure 14:
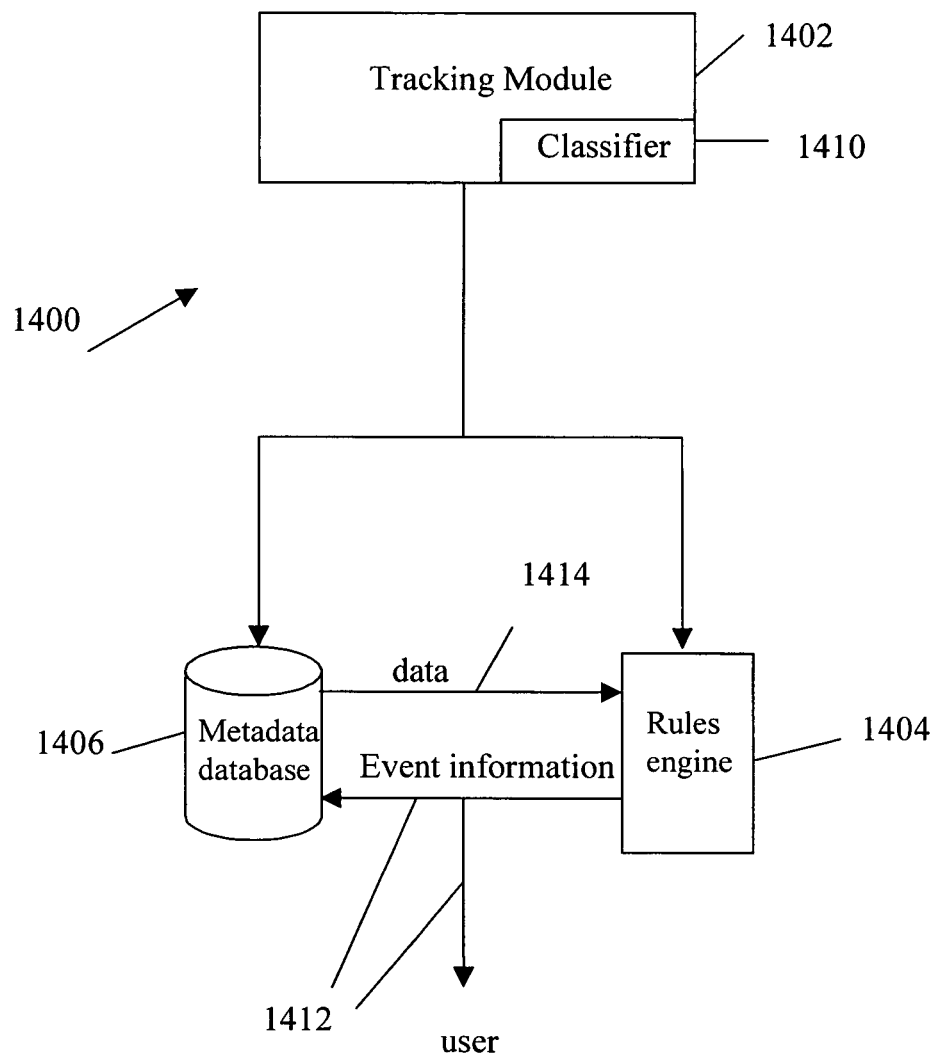
FIG. 14 is a more detailed version of a portion of the general video analysis system depicted in FIG. 3.

FIG. 14 shows a more detailed version of a portion of the general system shown in FIG. 3 and includes further dataflow connections. In particular, FIG. 14 includes the tracking module, classifier and rules engine shown in FIG. 3. In this example, the classifier is part of the tracking module but, of course, the classifier could be a stand alone module.

The portion of the CAS system 1400 shown in FIG. 14 includes a tracking module 1402, a rule engine 1404, and a tracking metadata database 1406. The tracking metadata may be produced, for example, by the tracking module that is described above and further classified by the classifier 1410. Of course, other tracking modules or classifiers could be used as will be readily understood by one of skill in the art.

Regardless of the tracking module used, the output thereof may be archived in a meta database 1406 and, in some embodiments, may also be directly analyzed by the rule engine 1404. In general, the rule engine 1404 evaluates rules against the tracking metadata and generates events if a rule matches some pattern in the metadata. These events may be archived in the database and, thus, also be made available to a user for review as indicated by the event data flow line 1412.

In general, the system shown in FIG. 14 may provide two types of searches: queries and alerts. A query is a one-time search that is evaluated on (possibly subsets of) all of the metadata in the metadata database 1402. A query may return many search results, which may, for example, be ranked and presented to the user. Executing a query is typically a user-interactive experience with many potential matches that may be reduced with further queries. To this end, the rules engine 1404 may be provided with access to the metadata database as indicated by data line 1414.

Alerts are searches that the system continually performs. Whenever the metadata database 1406 receives new metadata from the tracking module 1402, the new metadata is checked by the rule engine 1404 to see if it satisfies any of the pending alert criteria. The rule engine 1404 may perform this analysis on data that is in the metadata database 1406 or directly on the metadata as it is received from the tracking module 1402.

In either case, alerts are used to search for exceptional conditions in the tracking metadata that may be of interest to a human user. In some embodiments, executing an alert is not interactive but, rather, is based on previously specified alert criteria. When an alert fires (i.e., some data is found that meets the search criteria), the system may generate some sort of alert notification, such as a page, an email, a flashing screen, a sound, etc.

While used in different ways, queries and alerts may be implemented similarly. Each is a search that is executed on the tracking metadata stored in the metadata database 1406. The two merely differ in the frequency with which the search is executed and how the search results are presented to the user. As such, they will collectively be referred to as "searches" below.

As discussed above, searches may be conducted in tracking metadata stored in the metadata database 1406 and which was received from the tracking module 1402. At the highest level, the metadata in the metadata database 1406 may contain information about the contents of each video frame. For example, the metadata might record whether objects are in the frame or not, it might record the average color of the scene (e.g., for detecting lighting changes), or it might record the state of an object in the scene. In general, the tracking metadata records the properties of scene objects, background or foreground, considered independently or as a whole. However, because it is tracking metadata (i.e., received from the tracking module), it can contain dynamic properties as well as static properties. These dynamic properties may include, for example, motion characteristics such as velocity, acceleration and direction of an object.

The tracking module 1402 may produce properties for any object in the scene (or for the whole video frame itself). In general, the properties can be organized on a per-object basis (e.g., the entire video frame can be considered an object for sake of generality). Thus, when discussing a property, it can be assumed that the property is associated with some object that is being tracked by the system.

It is often the case that tracking engines, such as tracking module 1402, produce metadata for moving objects in the scene. Some interesting properties of these objects might include velocity, acceleration, direction, size, average color, gait, centroid, position, area, or other properties directly calculable from pixel intensities.

Tracking engines often include various classification algorithms, the output of which can also be included as object properties in the tracking metadata. Such classification properties might be one of car, human, animate, inanimate, employee, customer, criminal, victim, animal, child, adult, shopping cart, box, liquid, indeterminate, etc. A single object may be assigned many different classifications. For example, a young boy might be classified as human, animate, customer, child. A shopping cart might be inanimate, shopping cart.

The classification might also determine gender, ethnicity, age, etc. Other classification systems might deduce the state of the object, such as loitering, running, falling, walking, hiding, crashing, moving backwards, appeared, disappeared, etc. These designations can also be stored in the metadata.

Some tracking systems might be location-aware, in which case location information can be stored in the metadata. For example, each object may have a property that describes in which aisle or which department it is currently located.

The tracking system can also annotate an object with a list of other objects that are in close proximity to the first object. For example, an object might be close to a doorway, which could be recorded as a property (it could also be interpreted as a location, since doorways do not move). Also, an object might be close to another moving object; both objects could be annotated with the other's identifier. Sometimes objects might be nearby one another very often. It is possible that these objects are somehow associated (e.g., girlfriend and boyfriend, shopper and shopping cart, etc.) Associated objects can also be stored in metadata.

Often the properties of objects may change over time. For example, the classification may change from walking to running, or the location may change as the object moves through the environment. Because of this, the tracking metadata must also include timing information to accurately encode the series of the properties associated with each object. In many cases, a single property is not important, but a particular sequence of properties is interesting.

Searching the metadata database 1406 by the rule engine 1404 may entail finding objects that have certain properties or combinations of properties. These combinations of properties are expressed as "rules." For example, the rule "size=BIG and color=RED" will find all big, red objects that have been tracked. Another rule might be "objectID=1432," which retrieves the object that is labeled with ID #1432 in the metadata database. In this way, the metadata database 1406 is treated like a conventional database, and searches (queries, alerts, or rules-all the same) can be structured in similar ways. In this document, the terms "search" and "rule" are largely interchangeable, and "query" and "alert" have the distinctions described previously.

It is also useful to search the metadata for sequences of properties. For example, the search "state=RUNNING then FALLING" will find all objects that fell after running. It might be desired to find property transitions that are not consecutive but whose relative order is still preserved. For example, the search "location=HOUSEWARES followed by CHECKOUT" will find all people (and objects) that moved from the location identified as "housewares" to the location identified as "checkout," regardless of the locations visited in between the two specified locations.

Example Scenarios

Some searches are fairly generic (e.g., searching by objectID), but other searches are useful in specific scenarios. The following paragraphs describe a series of scenarios and some of the searches that are useful in those cases.

Detecting Theft Activities

Many theft activities in retail environments follow familiar patterns. Criminals may move through stores in well-known ways or do things that are out-of-the-ordinary. Careful specification of search criteria can often identify a retail theft before it finishes or allow a detective to find such activities during an investigation. Examples of such searches might be:

location=RETAIL_FLOOR followed by RETURNS_DESK (location=ENTRANCE followed by (not POINT-OF-SALE) then EXIT) and (location=EXIT and associated_object.classification=SHOPPING_CART)

(location=EXIT and associated_object.classification=SHOPPING_CART and duration>3 min)

Improving Parking Lot Security

Parking lots present a huge liability problem to the businesses that own and maintain them. Visitors and customers may be mugged or raped while in the parking lot, or cars and property may be stolen. Often, these criminal activities are preceded by suspicious behaviors of one or more individuals. For example, a mugger might be seen loitering in a parking lot before he attacks a victim. Automated searching of tracking metadata can be used to identify these behaviors before a crime is committed. For example:

classification=HUMAN and duration>5 minutes classification=HUMAN and nearby_object.classification=HUMAN and nearby_object.state=RUNNING (classification=CAR) and (state=MOVING then STOPPED) and (nearby_object.classification=CAR) and (nearby_object.state=MOVING then STOPPED)

(classification=HUMAN) and (state=MOVING then STOPPED then MOVING then STOPPED then MOVING then STOPPED) and (nearby_object.classification=CAR)

classification=CAR and state=MOVING and speed>25 mph

Improving Child Safety

Protecting the safety of children is one of the top priorities of security professionals, especially in retail and entertainment venues. Metadata searches can be used to find lost children, children that are being kidnapped, or children that are near dangerous equipment. Some searches for protecting children are as follows:

classification=CHILD and location=DANGEROUS_AREA classification=CHILD and nearby_object=NONE classification=CHILD and nearby_object not_equal associated_object and nearby_object.classification=HUMAN, ADULT classification=CHILD and nearby_object not_equal associated_object and nearby_object.classification=HUMAN, ADULT and location=EXIT Improving Public Safety Protecting the safety of people in general is also a primary concern. People can fall down in public places (e.g., slip-and-fall events), walk too close to dangerous areas (e.g., platform edge in a subway), or go the wrong way through an exit or on an escalator. These events are useful to flag as sources of injury to people and source of liability to businesses. Some example searches follow.

classification=HUMAN and location=DANGEROUS_AREA classification=INANIMATE and location=WALKWAY and state=APPEARED classification=HUMAN and ((location=OUTSIDE_EXIT followed by INSIDE_EXIT) or (location=INSIDE_ENTRANCE followed by OUTSIDE_ENTRANCE))

classification=HUMAN and state=FALLING

Operations and Merchandising

Often a business not only wants to ensure the security of its customers and products, but it also wants to know how those customers behave and react inside the business' environment. The statistics of how customers move throughout a store is very important for marketing and advertising purposes. Searching through tracking metadata is a very useful tool for acquiring those statistics. In this scenario, the specific search results are not particularly interesting, but the numbers of them are. So, a 'count' operator is introduced that simply counts the number of returned search results. By counting many different searches, interesting and useful statistics can be generated. Other useful operators can include 'SUM' and 'AVG' yielding the sum or the average, respectively, of returned search results. Here are a few examples:

count(location=ENTRANCE and state=APPEARED)

count(location=ENTRANCE then AISLE1)

count(location=ADVERTISING_DISPLAY and state=STOPPED and duration>30 s and duration<=1 min)

count(location=CHECKOUT_LINE and state=WAITING and duration>1 min)

Implementation

Many of the queries described above are easily implemented in standard database query languages. However, some of the "sequential" queries (e.g., then and followed by) do not have a direct correspondence with traditional database searches. Fortunately, as long as the tracking metadata is encoded in an appropriate format, these sequential queries can be implemented using a well-known computer science search technique known as "regular expressions."

Regular expressions are traditionally used for matching strings. A string is simply a sequence of characters (or tokens) taken from some finite alphabet. For example, ABCBCA is a string from the alphabet of capital letters. A regular expression is just a shorthand for describing large sets of strings with a single small expression. A regular expression is said to match a string if that string is a member of the set of strings that the regular expression describes.

As an example, consider the regular expression A(BC)*[AD] over the alphabet of capital letters. In words, this expression says "match any string that starts with an 'A' followed by any number of 'BC' segments and then ends in an 'A' or a 'D.'" In regular expression syntax, the parentheses group B and C into a single unit, the brackets mean "A or D," and the asterisk denotes "zero or more of the preceding unit." Thus, this expression matches AA, ABCD, and ABCBCA, but it does not match ABA, ABCBA, or AAA.

Regular expressions can be evaluated very simply using finite state machines (FSMs). A finite state machine consists of a set of states and a transition rule that describes how to transition from one state to another given some input. Some of the states are designated as "accepting" states. If, at the end of the input, the FSM state is an accepting state, then the FSM is said to accept (or match) the input.

When matching strings, the input to the FSM is the string. For each token in the string, the FSM transitions to a state. At the end of the string, the state of the FSM (accepting or not) determines is the string is matched or not.

Figure 15:
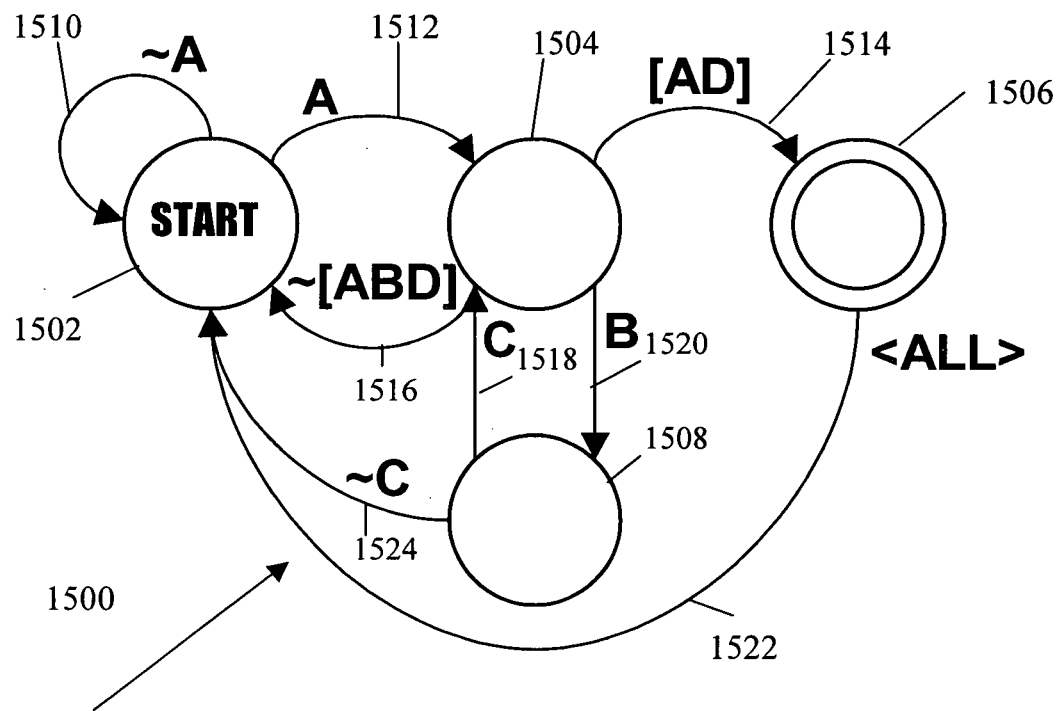
FIG. 15 is an illustrative finite state machine implementing a regular expression according to one embodiment of the invention.

For example, an FSM 1500 that implements the previously describe regular expression is shown in FIG. 15. FSM's for use in the system of the present invention may be implemented in software, hardware, firmware or combinations thereof as will be readily apparent to one of skill in the art. Each edge is annotated with the input that causes that transition to be taken from that state. Accepting states are shown with double lines.

In particular, different states are shown as nodes 1502, 1504, 1506 and 1508, and the transition rule is illustrated with edges, 1510, 1512, 1514, 1516, 1518, 1520, and 1522 between the nodes. In this example, node 1502 represents the start state. If, while in the start state of node 1502 the rule engine detects the appearance of an A, the FSM 1500 moves to node 1504 as indicated by edge 1512. If an A is not detected (i.e., ~A) the FSM 1500 remains at node 1502 as indicated by edge 1510. From node 1504 the FSM 1400 will move to the accepting state 1506 if it receives either an A or a D as indicated by edge 1514. The FSM will remain at node 1504 unless it receives an input that is not an A, a B or a D at which point it returns to start node 1502 as indicated by edge 1516 or it will transition to node 1408 if it receives a B as indicated by edge 1520. From state 1508 the FSM will return to the start node 1502 if it receives anything other than a C (as indicated by edge 1524) or will transition to state 1504 if it receives a C. In all cases, if the FSM 1500 reaches node 1506 the criteria is met, an alarm or other notification may be presented to a user and the FSM 1500 returns to start state 1502. The fact that an alarm was created may also be stored in the metadata database for further searching if desired.

In order to use regular expressions to search tracking metadata, the metadata may need to be encoded as strings. This encoding can be accomplished as follows. Each object property can be assigned a value from a finite set of values (i.e., the alphabet). Then, the time-ordered sequence of property values (i.e., tokens) for each object can be considered a string over the alphabet of property values. Certain sequences of property values can then be matched efficiently using regular expressions and FSMs.

Figure 16:
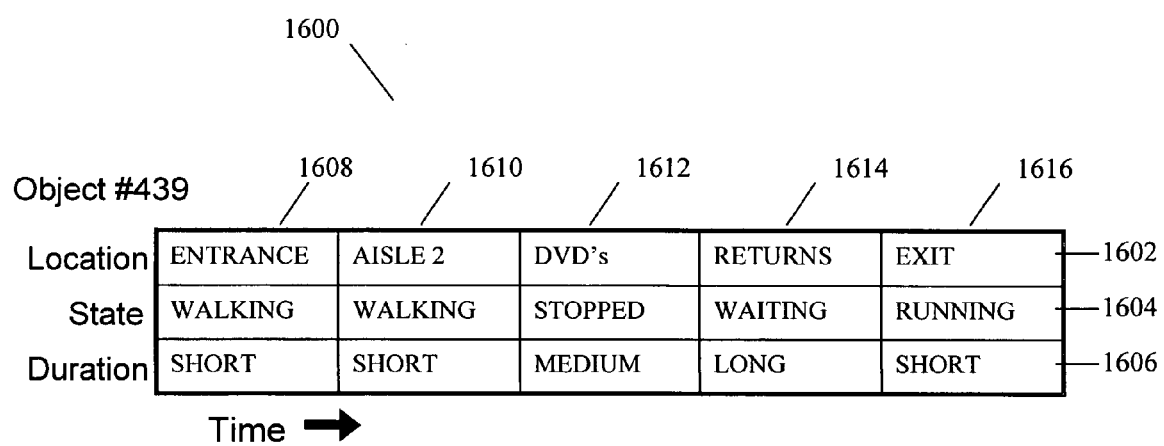
FIG. 16 is an illustrative data structure corresponding to a monitored object according to one embodiment of the invention.

For example, consider the object illustrated in FIG. 16. The object has three properties, location (row 1602), state (row 1604), and duration (row 1606) and each property can take on a different value at each time step. As shown in FIG. 16, each row 1608, 1610, 1614 and 1616 represents a different time period. The sequences of properties result in three strings that describe the evolution of the object properties as it is tracked by the tracking module. These strings can be searched for patterns of properties using regular expressions and finite state machines.

For example, consider the query location=ENTRANCE followed by (not POINT-OF-SALE) then EXIT.

Figure 17:
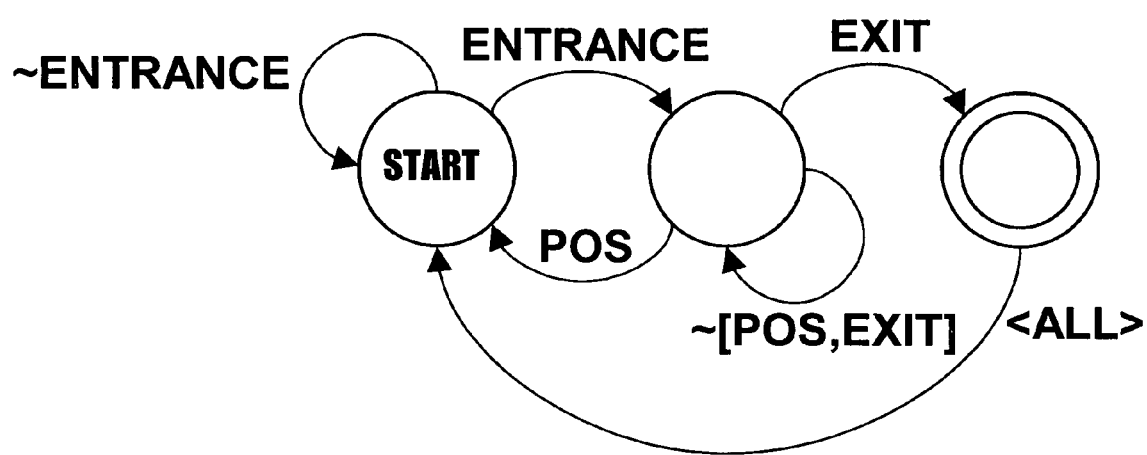
FIG. 17 is an illustrative finite state machine implementing a regular expression according to one embodiment of the invention.

Written as a regular expression, this query is ENTRANCE(~POS)*EXIT. In this case, ~ is a negation operator that means "any token except POS." The FSM implementing this regular expression is shown in FIG. 17.

Sometimes, it is useful search for property sequences that involve combinations of properties (e.g., location=ENTRANCE, state=WALKING followed by location=DANGEROUS_AREA, state=FALLING). Cases like this can be accommodated by combining the two property strings in a single combined property string. In the combined string, each token consists of two sub-tokens from each individual string. The alphabet of the combined string is the cross-product of the two individual alphabets (i.e., it consists of all unique pairs (a,b) of tokens, where a is from the first alphabet and b is from the second alphabet). This technique can be extended to three or more properties as needed.

For example, the combining the first two properties of the object in FIG. 16 for all time references (e.g., rows 1608-1616 respectively) results in the string <ENTRANCE, WALKING><AISLE2, WALKING><DVD's, STOPPED><RETURNS, WAITING><EXIT, RUNNING>. One might be interested in regular expressions containing the token <EXIT, RUNNING> to determine if a person recently stole a DVD from a store and ran out of the store.

One skilled in the art will realize the invention may be embodied in other specific forms without departing from the spirit or essential characteristics thereof. The foregoing embodiments are therefore to be considered in all respects illustrative rather than limiting of the invention. The scope of the invention is not limited to just the foregoing description.

What is claimed is:

1. A computerized method of video analysis comprising:
receiving, at a computerized receiving device, a plurality of series of video frames generated by a plurality of image sensors, each image sensor having a field-of-view that monitors a portion of a monitored environment;
concurrently tracking, using a tracking module, a plurality of objects with respect to the monitored environment as the objects move among fields-of-view, wherein the tracking is based at least in part on a transition probability table, in which a first axis of the table represents a first set of image regions within video frames generated by the image sensors at a first point in time, a second axis of the table represents a second set of image regions within video frames generated by the image sensors at a second point in time, and each entry in the table represents a likelihood that one of the plurality of objects included in the first-axis image region corresponding to the entry will transition by the second time period to the second-axis image region corresponding to the entry;

storing a plurality of blob states over time, each state including a number of objects included in the blob and a blob signature, wherein the transition probability table comprises probabilities that objects within one blob at one instant in time correspond to objects within other blobs at other instants in time; and predicting, concurrently with the tracking, an image sensor in the plurality of image sensors having a field-of-view in which at least one of the plurality of objects will be located at the second point in time, wherein the prediction is based on the presence of the at least one of the plurality of objects in a region in the first set of image regions at the first point in time and on the transition probability table, independent of calibration among the image sensors and the monitored environment.

2. The method of claim 1 wherein the image sensors are cameras.

3. The method of claim 1 further comprising altering the entries in the transition probability table upon analysis of additional video frames.

4. The method of claim 1 further comprising storing object data indicating correspondences between objects and blob states.

5. The method of claim 1 further comprising generating a tracking solution based on the blob states and the entries in the transition probability table.

6. The method of claim 1 generating tracking metadata including at least one of object track data, tracking solutions, object feature data and field-of-view data.

7. The method of claim 6 further comprising:
selecting a rule set to analyze generated tracking metadata; and
evaluating, using a rules engine, the tracking metadata based on the rule set.

8. The method of claim 7 further comprising selecting the rule set to monitor parking lot security.

9. The method of claim 7 further comprising selecting the rule set to detect property theft.

10. The method of claim 7 further comprising selecting the rule set to detect hazards to children.

11. The method of claim 7 further comprising selecting the rule set to monitor public safety.

12. The method of claim 7 further comprising selecting the rule set to determine merchandizing and operations statistics.

13. A computerized system for video analysis comprising:
a receiving module configured to receive a plurality of series of video frames, the series of video frames generated over time by a plurality of image sensors which monitor portions of a monitored environment and have a field-of-view; and
a calibration-independent tracking module in communication with the receiving module and configured to i) concurrently track a plurality of objects with respect to within the monitored environment as the objects move among fields-of-view, wherein the tracking is based at least in part on a transition probability table, in which a first axis of the table represents a first set of image regions within frames generated by the image sensors at a first point in time, a second axis of the table represents a second set of image regions within video frames generated by the image sensors at a second point in time, and each entry in the table represents a likelihood that one of the plurality of objects included in the first-axis image region corresponding to the entry will transition by the second time period to the second-axis image region corresponding to the entry, ii) store a plurality of blob states over time, each state including a number of objects included in the blob and a blob signature, wherein the transition probability table comprises probabilities that objects within one blob at one instant in time correspond to objects within other blobs at other instants in time, and iii) predict, concurrently with the tracking, an image sensor in the plurality of image sensors having a field-of-view in which at least one of the plurality of objects will be located at the second point in time, wherein the prediction is based on the presence of the at least one of the plurality of objects in a region in the first set of image regions at the first point in time and on the transition probability table, independent of calibration among the image sensors and the monitored environment.

14. The system of claim 13 wherein the tracking module is further configured to concurrently track the plurality of objects within one field-of-view based on at least some of the received series of video frames and independent of calibration among the image sensors and the monitored environment, the tracking module outputting tracking metadata.

15. A system for monitoring parking lot security comprising:
a receiving module configured to receive a plurality of series of video frames, the series of video frames generated over time by a plurality of image sensors which monitor portions of a monitored environment and have a field-of-view;
a calibration-independent tracking module in communication with the receiving module and configured to i) concurrently track a plurality of objects with respect to within the monitored environment as the objects move among fields-of-view, wherein the tracking is based at least in part on a transition probability table, in which a first axis of the table represents a first set of image regions within video frames generated by the image sensors at a first point in time, a second axis of the table represents a second set of image regions within video frames generated by the image sensors at a second point in time, and each entry in the table represents a likelihood that one of the plurality of objects included in the first-axis image region corresponding to the entry will transition by the second time period to the second-axis image region corresponding to the entry, ii) store a plurality of blob states over time, each state including a number of objects included in the blob and a blob signature, wherein the transition probability table comprises probabilities that objects within one blob at one instant in time correspond to objects within other blobs at other instants in time, and iii) predict, concurrently with tracking the plurality of objects, an image sensor in the plurality of image sensors having a field-of-view in which at least one of the plurality of objects will be located at the second point in time, wherein the prediction is based on the presence of the at least one of the plurality of objects in a region in the first set of image regions at the first point in time and on the transition probability table, independent of calibration among the image sensors and the monitored environment, and iii) concurrently track the plurality of objects within one field-of-view based on at least some of the received series of video frames and independent of calibration among the image sensors and the monitored environment, the tracking module outputting tracking metadata; and a rules engine utilizing a parking lot security rule set configured to receive and evaluate the tracking metadata.

16. A system for property theft detection comprising:

a receiving module configured to receive a plurality of series of video frames, the series of video frames generated over time by a plurality of image sensors which monitor portions of a monitored environment and have a field-of-view;

a calibration-independent tracking module in communication with the receiving module and configured to i) concurrently track a plurality of objects with respect to within the monitored environment as the objects move among fields-of-view, wherein the tracking is based at least in part on a transition probability table, in which a first axis of the table represents a first set of image regions within video frames generated by the image sensors at a first point in time, a second axis of the table represents a second set of image regions within video frames generated by the image sensors at a second point in time, and each entry in the table represents a likelihood that one of the plurality of objects included in the first-axis image region corresponding to the entry will transition by the second time period to the second-axis image region corresponding to the entry, ii) store a plurality of blob states over time, each state including a number of objects included in the blob and a blob signature, wherein the transition probability table comprises probabilities that objects within one blob at one instant in time correspond to objects within other blobs at other instants in time, and iii) predict, concurrently with tracking the plurality of objects, an image sensor in the plurality of image sensors having a field-of-view in which at least one of the plurality of objects will be located at the second point in time, wherein the prediction is based on the presence of the at least one of the plurality of objects in a region in the first set of image regions at the first point in time and on the transition probability table, independent of calibration among the image sensors and the monitored environment and iii) concurrently track the plurality of objects within one field-of-view based on at least some of the received series of video frames and independent of calibration among the image sensors and the monitored environment, the tracking module outputting tracking metadata; and a rules engine utilizing a theft detection rule set configured to receive and evaluate the tracking metadata.

17. A system for child hazard detection comprising:

a receiving module configured to receive a plurality of series of video frames, the series of video frames generated over time by a plurality of image sensors which monitor portions of a monitored environment and have a field-of-view;

a calibration-independent tracking module in communication with the receiving module and configured to i) concurrently track a plurality of objects with respect to within the monitored environment as the objects move among fields-of-view, wherein the tracking is based at least in part on a transition probability table, in which a first axis of the table represents a first set of image regions within video frames generated by the image sensors at a first point in time, a second axis of the table represents a second set of image regions within video frames generated by the image sensors at a second point in time, and each entry in the table represents a likelihood that one of the plurality of objects included in the first-axis image region corresponding to the entry will transition by the second time period to the second-axis image region corresponding to the entry, ii) store a plurality of blob states over time, each state including a number of objects included in the blob and a blob signature, wherein the transition probability table comprises probabilities that objects within one blob at one instant in time correspond to objects within other blobs at other instants in time, and iii) predict, concurrently with tracking the plurality of objects, an image sensor in the plurality of image sensors having a field-of-view in which at least one of the plurality of objects will be located at the second point in time, wherein the prediction is based on the presence of the at least one of the plurality of objects in a region in the first set of image regions at the first point in time and on the transition probability table, independent of calibration among the image sensors and the monitored environment and iii) concurrently track the plurality of objects within one field-of-view based on at least some of the received series of video frames and independent of calibration among the image sensors and the monitored environment, the tracking module outputting tracking metadata; and a rules engine utilizing a child safety rule set configured to receive and evaluate the tracking metadata.

18. A system for public safety monitoring comprising:

a receiving module configured to receive a plurality of series of video frames, the series of video frames generated over time by a plurality of image sensors which monitor portions of a monitored environment and have a field-of-view;

a calibration-independent tracking module in communication with the receiving module and configured to i) concurrently track a plurality of objects with respect to within the monitored environment as the objects move among fields-of-view, wherein the tracking is based at least in part on a transition probability table, in which a first axis of the table represents a first set of image regions within video frames generated by the image sensors at a first point in time, a second axis of the table represents a second set of image regions within video frames generated by the image sensors at a second point in time, and each entry in the table represents a likelihood that one of the plurality of objects included in the first-axis image region corresponding to the entry will transition by the second time period to the second-axis image region corresponding to the entry, ii) store a plurality of blob states over time, each state including a number of objects included in the blob and a blob signature, wherein the transition probability table comprises probabilities that objects within one blob at one instant in time correspond to objects within other blobs at other instants in time, and iii) predict, concurrently with tracking the plurality of objects, an image sensor in the plurality of image sensors having a field-of-view in which at least one of the plurality of objects will be located at the second point in time, wherein the prediction is based on the presence of the at least one of the plurality of objects in a region in the first set of image regions at the first point in time and on the transition probability table, independent of calibration among the image sensors and the monitored environment and iii) concurrently track the plurality of objects within one field-of-view based on at least some of the received series of video frames and independent of calibration among the image sensors and the monitored environment, the tracking module outputting tracking metadata; and a rules engine utilizing a public safety monitoring rule set configured to receive and evaluate the tracking metadata.

19. A system for merchandizing and operations statistical analysis comprising:

a receiving module configured to receive a plurality of series of video frames, the series of video frames generated over time by a plurality of image sensors which monitor portions of a monitored environment and have a field-of-view;

a calibration-independent tracking module in communication with the receiving module and configured to i) concurrently track a plurality of objects with respect to within the monitored environment as the objects move among fields-of-view, wherein the tracking is based at least in part on a transition probability table, in which a first axis of the table represents a first set of image regions within video frames generated by the image sensors at a first point in time, a second axis of the table represents a second set of image regions within video frames generated by the image sensors at a second point in time, and each entry in the table represents a likelihood that one of the plurality of objects included in the first-axis image region corresponding to the entry will transition by the second time period to the second-axis image region corresponding to the entry, ii) store a plurality of blob states over time, each state including a number of objects included in the blob and a blob signature, wherein the transition probability table comprises probabilities that objects within one blob at one instant in time correspond to objects within other blobs at other instants in time, and iii) predict, concurrently with tracking the plurality of objects, an image sensor in the plurality of image sensors having a field-of-view in which at least one of the plurality of objects will be located at the second point in time, wherein the prediction is based on the presence of the at least one of the plurality of objects in a region in the first set of image regions at the first point in time and on the transition probability table, independent of calibration among the image sensors and the monitored environment and iii) concurrently track the plurality of objects within one field-of-view based on at least some of the received series of video frames and independent of calibration among the image sensors and the monitored environment, the tracking module outputting tracking metadata; and a rules engine utilizing a merchandizing and operations statistical rule set configured to receive and evaluate the tracking metadata.

20. The method of claim 1 wherein the fields-of-view are non-overlapping.

21. The system of claim 13 wherein the fields-of-view are non-overlapping.

22. The system of claim 15 wherein the fields-of-view are non-overlapping.

23. The system of claim 16 wherein the fields-of-view are non-overlapping.

24. The system of claim 17 wherein the fields-of-view are non-overlapping.

25. The system of claim 18 wherein the fields-of-view are non-overlapping.

26. The system of claim 19 wherein the fields-of-view are non-overlapping.

27. The method of claim 1, further comprising:

concurrently tracking, using the tracking module and based on at least some of the received series of video frames, the plurality of objects with respect to the monitored environment based on an analysis of the monitored environment over time; and storing in at least one entry of the transition probability table the likelihood that the object included in the corresponding image region within the first video frame corresponds to the object included in the corresponding image region within the second video frame.

28. The system of claim 14 further comprising a rules engine in communication with the tracking module and receiving the tracking metadata.

29. The method of claim 1, wherein the tracking is further based at least in part on a second transition probability table, in which a first axis of the second table represents the first set of image regions at the first point in time, a second axis of the second table represents the second set of image regions at the first point in time, and each entry in the second table represents a likelihood that at least one of the plurality of objects included in the first-axis image region corresponding to the entry and at least one of the plurality of objects included in the second-axis image region corresponding to the entry correspond to the same object; and determining, based on the second transition probability table, a likelihood that one of the first set of image regions at least partially overlaps with one of the second set of image regions.

* * * * *